United States Patent
Ishikura

(10) Patent No.: US 12,541,593 B2
(45) Date of Patent: Feb. 3, 2026

(54) INFORMATION PROCESSING APPARATUS AND IMAGE PROCESSING SYSTEM

(71) Applicant: SHARP KABUSHIKI KAISHA, Sakai (JP)

(72) Inventor: Hiroyuki Ishikura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 413 days.

(21) Appl. No.: 18/216,200

(22) Filed: Jun. 29, 2023

(65) Prior Publication Data

US 2024/0004999 A1    Jan. 4, 2024

(30) Foreign Application Priority Data

Jul. 1, 2022 (JP) ................................ 2022-107291

(51) Int. Cl.
*G06F 21/56* (2013.01)

(52) U.S. Cl.
CPC .......... *G06F 21/563* (2013.01); *G06F 21/568* (2013.01)

(58) Field of Classification Search
CPC .... G06F 21/566; G06F 21/568; G06F 21/608; G06F 8/06; G06F 21/563
See application file for complete search history.

(56) References Cited

U.S. PATENT DOCUMENTS

| | | | |
|---|---|---|---|
| 2019/0327368 A1 | 10/2019 | Sugimoto et al. | |
| 2020/0151333 A1* | 5/2020 | Tomiyasu | G06F 3/1239 |
| 2023/0401315 A1* | 12/2023 | Seto | G06F 8/61 |

FOREIGN PATENT DOCUMENTS

JP    2019-192956 A    10/2019

* cited by examiner

Primary Examiner — Paul E Callahan
(74) Attorney, Agent, or Firm — ScienBiziP, P.C.

(57) ABSTRACT

In an image forming apparatus, appropriate virus infection countermeasure processing is executed using a new virus scanning engine or the like, and a likelihood that the image forming apparatus may be infected with a computer virus is reduced.

An information processing apparatus includes a print data acquirer that acquires print data, a virus detector that executes predetermined infection countermeasure processing on the print data and detects a computer virus, a virus scanning information generator that generates virus scanning information for specifying a setting item related to the infection countermeasure processing executed and adds the virus scanning information to print data in which a computer virus has not been detected by the virus detector, a print information generator that generates print information including print data requested from an image forming apparatus connected via a network among a plurality of pieces of the print data acquired, and a print information transmitter that transmits the generated print information to the image forming apparatus.

19 Claims, 20 Drawing Sheets

| PARENT DEVICE INFORMATION 41 | PARENT DEVICE NAME | MFP PARENT DEVICE |
|---|---|---|
| | PARENT DEVICE ID | MFP-P11 |
| | IP ADDRESS | IP1111 |

| CHILD DEVICE INFORMATION 42 | CHILD DEVICE NAME | MFP PARENT DEVICE |
|---|---|---|
| | CHILD DEVICE ID | MFP-C22 |
| | IP ADDRESS | IP2222 |

| ENCRYPTION KEY INFORMATION 43 | PARENT DEVICE PRIVATE KEY | OYASCK |
|---|---|---|
| | PARENT DEVICE PUBLIC KEY | OYAPUK |
| | CHILD DEVICE PUBLIC KEY | KOPUK |

| INPUT PRINT DATA 44 | FILE NAME | PRINT01 |
|---|---|---|
| | USER NAME | USER01 |

| VIRUS SCANNING INFORMATION (SC) 45 | SCANNING ENGINE NAME | SCEG1234 |
|---|---|---|
| | ENGINE VERSION | EGVER123 |
| | PATTERN VERSION | PTVER456 |
| | SCANNING PATTERN ACQUISITION DATE | 20220525 |
| | PARENT DEVICE ID | MFP-P11 |

| JOB LIST 46 | PRINT DATA NAME | PRINT01 | PRINT02 | PRINT03 |
|---|---|---|---|---|
| | VIRUS SCANNING INFORMATION | SC01 | SC01 | N/A |
| | TRANSMISSION SOURCE PARENT DEVICE INFORMATION | MFP-P11 | | |
| | TRANSMISSION DESTINATION CHILD DEVICE INFORMATION | MFP-C22 | | |

| TRANSMITTED PRINT INFORMATION 47 | TRANSMISSION SOURCE PARENT DEVICE INFORMATION | MFP-P11 |
|---|---|---|
| | TRANSMISSION DESTINATION CHILD DEVICE INFORMATION | MFP-C22 |
| | PRINT DATA NAME | PRINT01 |
| | PRINT FILE | PTFILE01 |
| | VIRUS SCANNING INFORMATION | SC01 |

| JOB LIST REQUEST 48 | TRANSMISSION DESTINATION PARENT DEVICE INFORMATION | MFP-C22 |
|---|---|---|
| | TRANSMISSION SOURCE CHILD DEVICE INFORMATION | MFP-P11 |
| | USER NAME | USER01 |

| PRINT DATA REQUEST 49 | TRANSMISSION DESTINATION PARENT DEVICE INFORMATION | MFP-C22 |
|---|---|---|
| | TRANSMISSION SOURCE CHILD DEVICE INFORMATION | MFP-P11 |
| | PRINT DATA NAME | PRINT01 |

FIG. 6

| PARENT DEVICE INFORMATION 141 | PARENT DEVICE NAME | MFP PARENT DEVICE |
|---|---|---|
| | PARENT DEVICE ID | MFP-P11 |
| | IP ADDRESS | IP1111 |

| CHILD DEVICE INFORMATION 142 | CHILD DEVICE NAME | MFP PARENT DEVICE |
|---|---|---|
| | CHILD DEVICE ID | MFP-C22 |
| | IP ADDRESS | IP2222 |

| ENCRYPTION KEY INFORMATION 143 | CHILD DEVICE PRIVATE KEY | COSCK |
|---|---|---|
| | CHILD DEVICE PUBLIC KEY | COPUK |
| | PARENT DEVICE PUBLIC KEY | OYAPUK |

| SCANNING PROCESSING INFORMATION 144 | SCANNING ENGINE NAME | SCEG1234 |
|---|---|---|
| | ENGINE VERSION | EGVER123 |
| | PATTERN VERSION | PTVER456 |
| | SCANNING PATTERN ACQUISITION DATE | 20220525 |

| JOB LIST REQUEST 145 | TRANSMISSION DESTINATION PARENT DEVICE INFORMATION | MFP-C22 | | |
|---|---|---|---|---|
| | TRANSMISSION SOURCE CHILD DEVICE INFORMATION | MFP-P11 | | |
| | USER NAME | USER01 | | |

| RECEIVED JOB LIST 146 | PRINT DATA NAME | PRINT01 | PRINT02 | PRINT03 |
|---|---|---|---|---|
| | VIRUS SCANNING INFORMATION | SC01 | SC01 | N/A |
| | TRANSMISSION SOURCE PARENT DEVICE INFORMATION | MFP-P11 | | |
| | TRANSMISSION DESTINATION CHILD DEVICE INFORMATION | MFP-C22 | | |

| RECEIVED PRINT INFORMATION 147 | TRANSMISSION SOURCE PARENT DEVICE INFORMATION | MFP-P11 |
|---|---|---|
| | TRANSMISSION DESTINATION CHILD DEVICE INFORMATION | MFP-C22 |
| | PRINT DATA NAME | PRINT01 |
| | PRINT FILE | PTFILE01 |
| | VIRUS SCANNING INFORMATION | SC01 |

| PRINT DATA REQUEST 148 | TRANSMISSION DESTINATION PARENT DEVICE INFORMATION | MFP-C22 |
|---|---|---|
| | TRANSMISSION SOURCE CHILD DEVICE INFORMATION | MFP-P11 |
| | PRINT DATA NAME | PRINT01 |

FIG. 7

PRINT JOB LIST DISPLAY SCREEN: G1

103 DISPLAY OF CHILD DEVICE

PRINT JOB LIST       (PLEASE SELECT DATA TO BE PRINTED)

| PRINTING SELECTED/ NOT SELECTED | UNSCANNED/ SCANNED | PRINT DATA NAME |
|---|---|---|
| ○ (SELECTED) | ○ (SCANNED) | PDT001 |
|  | ○ (SCANNED) | PDT002 |
| ○ (SELECTED) | ○ (SCANNED) | PDT050 |
|  | — (UNSCANNED) | PDT111 |
|  | — (UNSCANNED) | PDT200 |

PRINT

FIG. 8

SCANNING INFORMATION DETAILS DISPLAY SCREEN: G2

103 DISPLAY OF CHILD DEVICE

DETAILS OF SCANNING INFORMATION

| PRINT DATA NAME | PDT001 |
|---|---|
| PRINTING SELECTED/NOT SELECTED | ○ (SELECTED) |
| UNSCANNED/SCANNED | ○ (SCANNED) |
| SCANNING PARENT DEVICE NAME | MFP-P101 |
| SCANNING ENGINE NAME | SCENG20 |
| SCANNING ENGINE VERSION | SCVER05 |
| SCANNING PATTERN VERSION | PTVER205 |
| SCANNING PATTERN ACQUISITION DATE | PT20200510 |

RETURN

FIG. 9

WHEN VIRUS SCANNING INFORMATION IS NOT ENCRYPTED

| | SETTING OF PARENT DEVICE (MFP-P) | | | | | | STATE OF CHILD DEVICE (MFP-C) | | | | | | WHEN SCANNING ENGINE IS INCLUDED IN CHILD DEVICE | | | | PRINTING-OUT IN CHILD DEVICE | |
|---|---|---|---|---|---|---|---|---|---|---|---|---|---|---|---|---|---|---|
| | ENCRYPTION | | ENCRYPTION KEY | | JOB LIST | | SCANNING ENGINE | | RECEIVED SCANNING INFORMATION | | WHETHER DECRYPTION IS EXECUTABLE | | RECEPTION ENGINE Ver RECEPTION PATTERN DATE | | VIRUS CHECK DETECTION IN CHILD DEVICE | | WHETHER PRINTING IS EXECUTABLE | |
| No. | PERFORMED | NOT PERFORMED | PARENT DEVICE | CHILD DEVICE | ONLY SCANNED JOB | INCLUDING UNSCANNED JOB | INCLUDED | NOT INCLUDED | INCLUDED | NOT INCLUDED | EXECUTABLE | NOT EXECUTABLE | NEW | OLD | NO VIRUS DETECTED | VIRUS DETECTED | PRINTED | NOT PRINTED |
| A01 | - | ○ | - | - | ○ | - | - | ○ | ○ | - | - | - | - | - | - | - | ○ | - |
| A02 | - | ○ | - | - | - | ○ | - | ○ | ○ | - | - | - | - | - | - | - | ○ | - |
| A03 | - | ○ | - | - | - | ○ | ○ | - | - | ○ | - | - | - | - | - | - | - | ○ |
| A04 | - | ○ | - | - | ○ | - | ○ | - | ○ | - | - | - | ○ | - | ○ | - | ○ | - |
| A05 | - | ○ | - | - | - | ○ | ○ | - | ○ | - | - | - | - | ○ | ○ | - | ○ | - |
| | - | ○ | - | - | - | - | ○ | - | ○ | - | - | - | ○ | - | - | ○ | - | ○ |
| | - | ○ | - | - | - | - | ○ | - | ○ | - | - | - | - | ○ | ○ | - | ○ | - |
| | - | ○ | - | - | - | - | ○ | - | - | ○ | - | - | - | - | - | - | - | ○ |

WHEN VIRUS SCANNING INFORMATION IS ENCRYPTED AND DECRYPTED WITH ENCRYPTION KEY OF CHILD DEVICE

| | SETTING OF PARENT DEVICE (MFP-P) | | | | | | STATE OF CHILD DEVICE (MFP-C) | | | | | | WHEN SCANNING ENGINE IS INCLUDED IN CHILD DEVICE | | | | PRINTING-OUT IN CHILD DEVICE | |
|---|---|---|---|---|---|---|---|---|---|---|---|---|---|---|---|---|---|---|
| | ENCRYPTION | | ENCRYPTION KEY | | JOB LIST | | SCANNING ENGINE | | RECEIVED SCANNING INFORMATION | | WHETHER DECRYPTION IS EXECUTABLE | | RECEPTION ENGINE Ver. / RECEPTION PATTERN DATE | | VIRUS CHECK DETECTION IN CHILD DEVICE | | WHETHER PRINTING IS EXECUTABLE | |
| No. | PERFORMED | NOT PERFORMED | PARENT DEVICE | CHILD DEVICE | ONLY SCANNED JOB | INCLUDING UNSCANNED JOB | INCLUDED | NOT INCLUDED | INCLUDED | NOT INCLUDED | EXECUTABLE | NOT EXECUTABLE | NEW | OLD | NO VIRUS DETECTED | VIRUS DETECTED | PRINTED | NOT PRINTED |
| C01 | ○ | - | - | ○ | ○ | - | - | ○ | ○ | - | - | ○ | - | - | - | - | - | ○ |
| | ○ | - | - | ○ | ○ | - | - | ○ | ○ | - | ○ | - | - | - | - | - | ○ | - |
| C02 | ○ | - | - | ○ | - | ○ | - | ○ | ○ | - | ○ | - | - | - | - | - | ○ | - |
| | ○ | - | - | ○ | - | ○ | - | ○ | - | ○ | - | ○ | - | - | - | - | - | ○ |
| C03 | ○ | - | - | ○ | - | ○ | - | ○ | ○ | - | ○ | - | -(Δ1) | - | - | - | - | ○ |
| | ○ | - | - | ○ | - | ○ | - | ○ | ○ | - | ○ | - | - | -(Δ2) | - | - | - | ○ |
| | ○ | - | - | ○ | - | ○ | - | ○ | ○ | - | - | ○ | - | - | - | - | - | ○ |
| C04 | ○ | - | - | ○ | - | ○ | ○ | - | ○ | - | ○ | - | ○ | - | ○ | - | ○ | - |
| | ○ | - | - | ○ | - | ○ | ○ | - | ○ | - | ○ | - | - | ○ | ○ | - | ○ | - |
| | ○ | - | - | ○ | - | ○ | ○ | - | - | ○ | - | ○ | - | - | ○ | - | - | ○ |
| | ○ | - | - | ○ | - | ○ | ○ | - | - | ○ | - | ○ | - | - | - | ○ | - | ○ |
| | ○ | - | - | ○ | - | ○ | ○ | - | - | ○ | - | ○ | - | - | - | ○ | - | ○ |

(Δ1, Δ2: COMPARISON WITH CURRENT DATE AND TIME)

INFORMATION PROCESSING APPARATUS AND IMAGE PROCESSING SYSTEM

TECHNICAL FIELD

The present disclosure relates to an information processing apparatus and an image processing system, and more particularly to an information processing apparatus having a virus infection countermeasure function for detecting and removing computer viruses, and an image processing system for performing infection countermeasure processing on print data or the like transmitted and received between the information processing apparatus and a plurality of image forming apparatuses connected to each other via a network.

BACKGROUND ART

Hitherto, image forming apparatuses having a large number of functions such as a printing function, a document reading function, a read image data transmitting function, an image data acquisition function, and a character recognition function have been used.

In addition, an image processing system is used in which an image forming apparatus (referred to as a parent device) that temporarily stores image data received via a network and has a printing function or the like and an image forming apparatus (referred to as a child device) that has a function of printing image data acquired from the parent device are connected to each other via a network.

In some image processing systems, a parent device and a child device have a function of checking whether transmitted image data has been infected with a predetermined computer virus (hereinafter, also simply referred to as a virus), isolate image data infected with a virus, and print only image data not infected with a virus.

In addition, there is known an image forming system in which a plurality of image forming apparatuses are connected to each other via a network, the plurality of image forming apparatuses including a storage device that stores print data or the like transmitted from an information processing terminal, and a client device that accesses the storage device and acquires the print data from the storage device, the storage device executing virus check processing on received print data D1, determining whether the virus check processing for requested print data D1 has already been completed in a case where a data request for the print data D1 has been received from the client device, and adding checked information D3 to the print data D1 and transmitting the print data D1 having the checked information D3 added thereto to the client device in a case where it is determined that the virus check processing has already been completed and a predetermined condition is satisfied.

In this system, when the client device acquires the print data D1 from the storage device, the client device checks whether the checked information D3 has been added, starts printing-out without performing the virus check processing on the print data D1 when the checked information D3 has been added, and performs the virus check processing on the print data D1 when the checked information D3 has not been added, whereby it is possible to reduce a period of time until printing-out is started in the client device.

SUMMARY

Technical Problem

However, although it is preferable that the virus check processing performed in the image forming apparatus be executed using the latest virus scanning engine and the latest virus pattern file, when the virus pattern file or the like used in the virus check processing has not been updated to the latest version, virus check processing is executed using a scanning engine or a pattern file which is not the latest version, and thus the virus checking is incomplete, and viruses may not be detected.

For example, even when the checked information D3 has been added to the print data D1, it is unclear whether the virus check processing executed in the storage device is executed using the latest virus pattern file or the like, and the print data D1 transmitted to the client device is not necessarily safe.

Further, the checked information D3 does not necessarily prove that the print data D1 has not been infected only by indicating that the print data D1 having the checked information D3 added thereto has already been subjected to the virus check processing, and since print data having not been subjected to virus check processing in the storage device is also transmitted to the client device, the concern of the client device being infected has not been completely eliminated.

Further, there is a case where a period of time until printing-out is started cannot be reduced, since virus check processing is executed in the client device without adding the checked information D3 to the print data for which the virus check processing has been completed but the predetermined condition is not satisfied or the print data that has not been subjected to the virus check processing. Further, in a case where the virus check processing in the client device does not use the latest virus pattern file or the like, there is a concern that the client device may be infected by print data from which a virus could not be removed.

Consequently, the present disclosure has been made in view of the above-described circumstances, and an object of the present disclosure is to alleviate a concern that an image forming apparatus may be infected with a computer virus by executing virus infection countermeasure processing using a new virus scanning engine and a new virus pattern file as much as possible in a parent device or a child device when a plurality of image forming apparatuses are connected to each other via a network, and image data to be subjected to processing such as printing is transferred from the parent device to the child device.

Solution to Problem

According to an aspect of the present disclosure, there is provided an information processing apparatus including a print data acquirer that acquires print data, a virus detector that executes predetermined infection countermeasure processing on the print data and detects a computer virus, a virus scanning information generator that generates virus scanning information for specifying a setting item related to the infection countermeasure processing executed and adds the virus scanning information to print data in which a computer virus has not been detected by the virus detector, a print information generator that generates print information including print data requested from an image forming apparatus connected via a network among a plurality of pieces of the print data acquired, and a print information transmitter that transmits the generated print information to the image forming apparatus.

The print information generator generates print information including print data which is requested by the image forming apparatus and to which the virus scanning information is added.

The infection countermeasure processing includes virus scanning processing for detecting a known computer virus by using a predetermined virus scanning engine and a predetermined virus pattern file, and the virus scanning information includes a name and version information of the virus scanning engine, version information of the virus pattern file, and information of date when the virus pattern file is acquired.

The information processing apparatus may be an image forming apparatus that temporarily stores the acquired print data and performs image forming.

According to another aspect of the present disclosure, there is provided an image processing system in which a first image forming apparatus that temporarily stores print data and a second image forming apparatus that prints the print data are connected to each other via a network, the first image forming apparatus including a print data acquirer that acquires print data, a storage that temporarily stores the acquired print data, a virus detector that executes predetermined infection countermeasure processing on the print data and detects a computer virus, a virus scanning information generator that generates virus scanning information for specifying a setting item related to the executed infection countermeasure processing and adds the virus scanning information to print data in which a computer virus has not been detected by the virus detector, a print information generator that generates print information including print data requested by the second image forming apparatus among a plurality of pieces of the print data temporarily stored, and a print information transmitter that transmits the generated print information to the second image forming apparatus, and the second image forming apparatus including a print data requester that requests the first image forming apparatus to transmit predetermined print data among the plurality of pieces of the print data temporarily stored in the first image forming apparatus, a print information receiver that receives print information transmitted from the first image forming apparatus, a scanning information acquirer that acquires virus scanning information added to print data included in the received print information, a printing execution determiner that determines whether to print the print data included in the received print information by using the acquired virus scanning information, and a function executor that prints the print data when the printing execution determiner determines that the print data is to be printed.

In the image processing system, the print information generated by the print information generator includes the print data to which the virus scanning information is added.

In the image processing system, the infection countermeasure processing includes virus scanning processing of detecting a known computer virus by using a first virus scanning engine and a first virus pattern file, and the virus scanning information includes a name and version information of the first virus scanning engine, version information of the first virus pattern file, and information of date when the first virus pattern file is acquired.

When the print information received by the print information receiver includes the print data to which the virus scanning information is added and the print data to which no virus scanning information is added, the printing execution determiner determines that the print data to which the virus scanning information is added is to be printed, and determines that the print data to which no virus scanning information is added is not to be printed.

The image processing system further includes a job list processor that when the first image forming apparatus has received a job list request transmitted from the second image forming apparatus, generates a job list and transmits the generated job list to the second image forming apparatus having transmitted the job list request, the job list including a name of print data requested in the job list request among a plurality of pieces of the print data temporarily stored in the storage of the first image forming apparatus, and the print data also including the virus scanning information when the requested print data is print data to which the virus scanning information is added.

The second image forming apparatus further includes a job list receiver that receives the job list transmitted from the first image forming apparatus, and a display, and when the job list receiver has received the job list, the received job list is displayed on the display.

The second image forming apparatus further includes a second virus detector that detects a computer virus by executing infection countermeasure processing including virus scanning processing on the received print data, the virus scanning processing being for detecting a known computer virus by using a second virus scanning engine and a second virus pattern file, and a second storage that stores scanning processing information including a name and version information of the second virus scanning engine, version information of the second virus pattern file, and date information on acquisition of the second virus pattern file, and the printing execution determiner compares the virus scanning information added to the received print data with the scanning processing information stored in the second storage, and determines that the print data is to be printed when the virus scanning information is newer than the scanning processing information, and determines that the print data is not to be printed when the virus scanning information is older than the scanning processing information.

The printing execution determiner compares information of date when the first virus pattern file included in the virus scanning information added to the received print data is acquired with information of date when the second virus pattern file included in the scanning processing information stored in the second storage is acquired, determines that the print data is to be printed when the information of date when the first virus pattern file is acquired is newer than the information of date when the second virus pattern file is acquired, and determines that the print data is not to be printed when the information of date when the first virus pattern file is acquired is older than the information of date when the second virus pattern file is acquired.

The second virus detector executes the infection countermeasure processing on the print data determined not to be printed by the printing execution determiner, and the print data in which a computer virus has been detected is not to be printed, and the print data in which a computer virus has not been detected is to be printed.

The first image forming apparatus further includes an encryption processor that encrypts the generated virus scanning information with a first encryption key, the virus scanning information generator adds the encrypted virus scanning information to the print data, the second image forming apparatus further includes a decryption processor that decrypts the encrypted virus scanning information with a second encryption key, and the decryption processor decrypts the encrypted virus scanning information added to the print data included in the print information received by the print information receiver, and then the scanning information acquirer acquires the decrypted virus scanning information as virus scanning information.

When the print data to which the encrypted virus scanning information is added is included in the print information received by the print information receiver, and the encrypted virus scanning information is decrypted by the decryption processor, the printing execution determiner determines that the print data to which the encrypted virus scanning information is added is to be printed when the decryption has been performed normally, and determines that the print data to which the encrypted virus scanning information is added is not to be printed when the decryption has not been performed normally.

The first encryption key is a private key for the first image forming apparatus, and the second encryption key is a public key for the first image forming apparatus.

The first encryption key is a public key for the second image forming apparatus, and the second encryption key is a private key for the second image forming apparatus.

The second image forming apparatus further includes a second virus detector that detects a computer virus by executing infection countermeasure processing including virus scanning processing on the received print data, the virus scanning processing being for detecting a known computer virus by using a second virus scanning engine and a second virus pattern file, the second virus detector executes the infection countermeasure processing on the print data determined not to be printed by the printing execution determiner, and the print data in which a computer virus has been detected is not to be printed, and the print data in which a computer virus has not been detected is to be printed.

According to another aspect of the present disclosure, there is provided an infection countermeasure method for an image processing system in which a first forming image apparatus that temporarily stores print data and a second image forming apparatus that prints the print data are connected to each other via a network, the infection countermeasure method including, by a first controller included in the first image forming apparatus, acquiring print data, temporarily storing the acquired print data, executing predetermined infection countermeasure processing on the print data and detecting a computer virus, generating virus scanning information for specifying a setting item related to the executed infection countermeasure processing, and adding the virus scanning information to the print data in which a computer virus has not been detected in the detecting of the computer virus, generating print information including print data requested by the second image forming apparatus among a plurality of pieces of the print data temporarily stored, and transmitting the generated print information to the second image forming apparatus, and by a second controller included in the second image forming apparatus, requesting the first image forming apparatus to transmit predetermined print data among the plurality of pieces of the print data temporarily stored in the first image forming apparatus, receiving print information transmitted from the first image forming apparatus, acquiring virus scanning information added to print data included in the received print information, determining whether to print the print data included in the received print information by using the acquired virus scanning information, and printing the print data when it is determined that the print data is to be printed in the determining of whether to print the print data.

Advantage Effects of Disclosure

According to the present disclosure, a computer virus is detected by executing predetermined infection countermeasure processing on print data acquired by an information processing apparatus, virus scanning information specifying setting items related to the executed infection countermeasure processing is generated, the virus scanning information is added to print data in which no computer virus has been detected, and print information including print data requested from an image forming apparatus connected to each other via a network among the acquired print data is generated and transmitted to the image forming apparatus, and thus it is possible to reduce the risk of infection in the image forming apparatus.

Further, for example, in a case where when print data to be subjected to processing such as printing in the image forming apparatus is transferred from the information processing apparatus to the image forming apparatus, the information processing apparatus executes virus infection countermeasure processing as appropriate as possible and then transmits the print data to the image forming apparatus, and thus it is possible to reduce a concern that the image forming apparatus may be infected with a computer virus, and the image forming apparatus can determine whether to print the print data by using the virus scanning information added to the print data.

BRIEF DESCRIPTION OF DRAWINGS

FIG. 6 is a diagram illustrating an example of information stored in a storage of the image forming apparatus (parent device) according to the present disclosure.

FIG. 7 is a diagram illustrating an example of information stored in a storage of the image forming apparatus (child device) according to the present disclosure.

FIG. 8 is a diagram illustrating an example of a print job list display screen displayed on the image forming apparatus (child device) according to the present disclosure.

FIG. 9 is a diagram illustrating an example of a scanning information details display screen displayed on the image forming apparatus (child device) according to the present disclosure.

FIG. 10 is a diagram illustrating an example of a correspondence relationship between setting conditions in a case where virus scanning information is not encrypted and whether printing is executable in a child device in the image processing system according to the present disclosure.

FIG. 11 is a diagram illustrating an example of a correspondence relationship between setting conditions in a case where virus scanning information is encrypted and decrypted with an encryption key of the parent device and whether printing is executable in the child device in the image processing system according to the present disclosure.

FIG. 12 is a diagram illustrating an example of a correspondence relationship between setting conditions in a case where virus scanning information is encrypted and decrypted with an encryption key of the child device and whether printing is executable in the child device in the image processing system according to the present disclosure.

DESCRIPTION OF EMBODIMENTS

An embodiment of the present disclosure will be described below with reference to the drawings. Note that the present disclosure is not limited by the description of the following examples.
Configuration of Image Processing System An image processing system according to the present disclosure is a system including a plurality of information processing apparatuses connected to each other via a network. In particular, the image processing system is a system in which a first information processing apparatus that temporarily stores print data or the like and a second information processing apparatus that has a function of acquiring print data or the like and printing the print data or the like are connected to each other via a network.

For example, the image processing system is a system in which a first image forming apparatus for temporarily storing print data and a second image forming apparatus having a function of printing the print data are connected to each other via a network. After infection countermeasure processing such as virus scanning is performed on image data for printing (hereinafter referred to as print data) input to the first image forming apparatus, the second image forming apparatus executes printing processing or the like only on print data having no risk of infection.

In the following examples, a first image forming apparatus that temporarily stores print data will be referred to as a parent device, and a second image forming apparatus that has a function of printing print data will be referred to as a child device.

In the following examples, an image processing system including an image forming apparatus will be described. However, an information processing apparatus according to the present disclosure is not limited to the image forming apparatus, and may be applied to another information processing apparatus or information processing system capable of executing infection countermeasure processing on predetermined input information.

In addition to the image forming apparatus, the information processing apparatus may be, for example, a personal computer, a scanner, an information communication apparatus, an information display apparatus, a NAS, a cloud storage, or the like having an infection countermeasure function.

Figure 1:
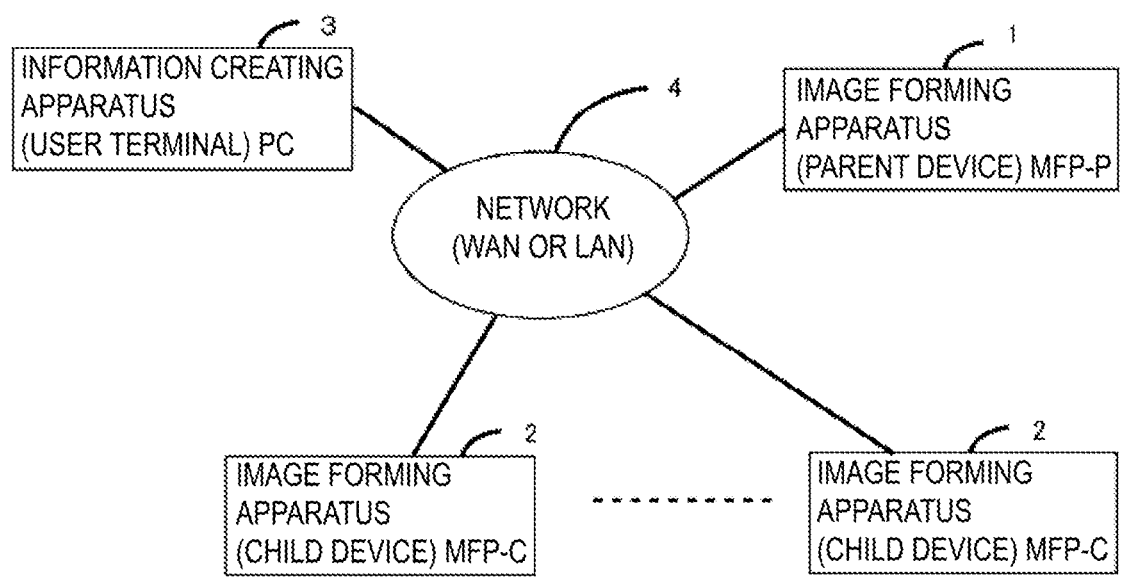
FIG. 1 is a configuration block diagram of an example of an image processing system according to the present disclosure.
Figure 2:
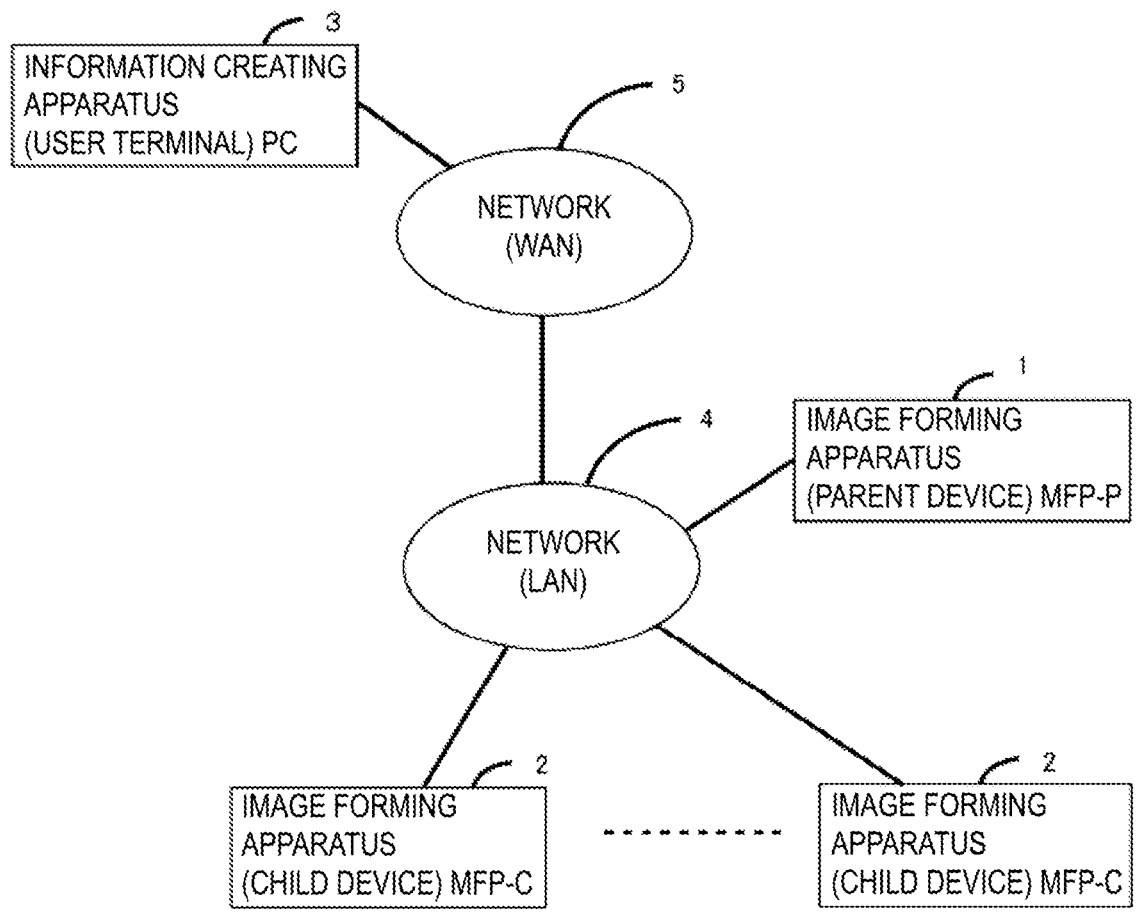
FIG. 2 is a configuration block diagram of an example of the image processing system according to the present disclosure.
Figure 3:
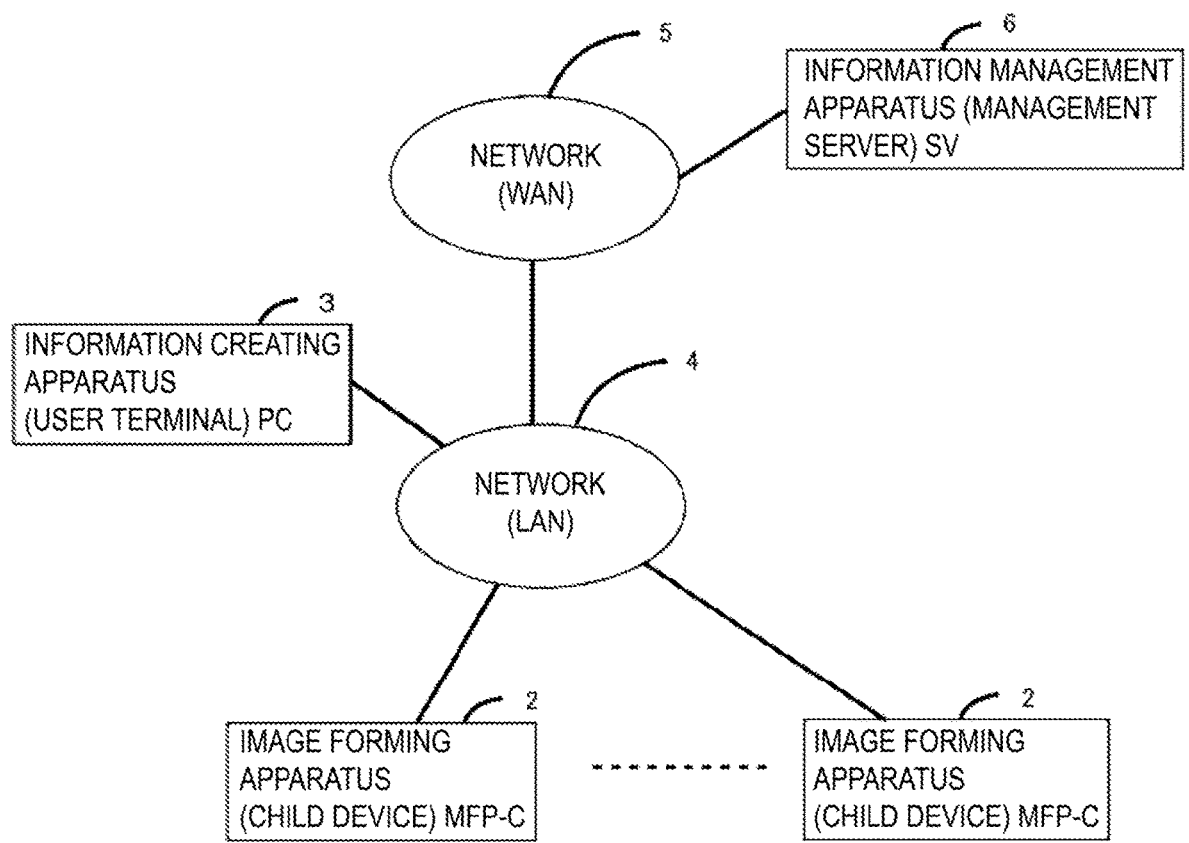
FIG. 3 is a configuration block diagram of an example of the image processing system according to the present disclosure.

FIGS. 1, 2, and 3 are configuration block diagrams illustrating an example of the image processing system according to the present disclosure.

The image processing system of FIG. 1 mainly includes one image forming apparatus (parent device) 1 and a plurality of image forming apparatuses (child devices) 2 connected to a network 4, and an information creating apparatus 3 is connected to the network 4 as an apparatus that creates information for printing or the like and transmits the information to the parent device 1.

The network 4 may be a wide area network (WAN) such as the Internet, or may be a local area network (LAN).

A communication mode in which these apparatuses are connected to the network may be wired communication or wireless communication.

The image forming apparatus (parent device) 1 and the image forming apparatus (child device) 2 are apparatuses that process image data, and perform input, formation, output, storage, transfer, and the like of image data.

The image forming apparatus is also referred to as a multifunction peripheral (MFP) or simply as an MFP. Among the image forming apparatuses, the parent device 1 is also referred to as an MFP-P, and the child device 2 is also referred to as an MFP-C.

Which image forming apparatus among the plurality of image forming apparatuses becomes a parent device is set in advance when starting to use the system, and the other image forming apparatuses are set as child devices.

However, the number of parent devices may be one, but in a case where several groups are formed by a plurality of image forming apparatuses, the number of parent devices may be two or more, and one image forming apparatus may be a parent device in one group.

The information creating apparatus 3 is equivalent to, for example, a personal computer or the like owned by a user who uses the image forming apparatus, and the user creates information such as image data in the information creating apparatus 3 and transmits information for the purpose of printing (print data) to the image forming apparatus (parent device) 1 in order to print the created information.

The information creating apparatus 3 is also referred to as a user terminal or simply a PC.

The image forming apparatus (child device) 2 has, for example, a function of printing print data, requests the image forming apparatus (parent device) 1 to transmit the print data by the user's predetermined operation in the child device, and prints the print data transmitted from the image forming apparatus (parent device) 1 on a predetermined sheet.

The image forming apparatus (parent device) 1 is an apparatus that temporarily stores information for the purpose of printing (print data), and the like that are transmitted from the information creating apparatus (user terminal) 3, and when the image forming apparatus (parent device) 1 is requested to transmit the temporarily stored print data by the image forming apparatus (child device), the image forming apparatus (parent device) 1 transmits the temporarily stored print data to the child device 2 that has requested the transmission.

The parent device 1 is an image forming apparatus having an image forming function of temporarily storing acquired print data and printing the temporarily stored print data. When a user performs an operation of printing desired print data in the parent device, the parent device 1 prints the temporarily stored print data.

However, an apparatus that temporarily stores information for the purpose of printing (print data) that is transmitted from the information creating apparatus (user terminal) 3 does not necessarily need to be the parent device 1, and may be an information management apparatus (management server: SV) having a function of temporarily storing predetermined information.

The information management apparatus (management server) need not have a function of processing image data like the image forming apparatus.

In the image processing system of FIG. 2, the image forming apparatus (parent device) 1 and the plurality of image forming apparatuses (child devices) 2 are connected to the network (LAN) 4, and the information creating apparatus 3 that creates information for printing or the like and transmits the information to the parent device 1 is connected to a network (WAN) 5. Also in this case, the information management apparatus (management server) may be connected to the network (LAN) 4 instead of the parent device 1.

In the image processing system of FIG. 3, the plurality of image forming apparatuses (child devices) 2 and the information creating apparatus 3 are connected to the network (LAN) 4, and an information management apparatus (management server: SV) 6 is connected to the network (WAN) 5 instead of the image forming apparatus (parent device) 1.

Although not illustrated in the drawing, a connection mode in which the plurality of image forming apparatuses (child devices) 2 are connected to the network (LAN) 4, and the information creating apparatus 3 and the image forming apparatus (parent device) 1 or the information management apparatus (management server: SV) 6 are connected to the network (WAN) 5 may be adopted, or another connection mode may be adopted.

The image forming apparatus (parent device) 1 or the information management apparatus (management server: SV) 6 stores information on one or a plurality of image forming apparatuses (child devices) 2 under management and information on the information creating apparatus 3 connectable to the parent device 1 in advance.

For example, a device name, an IP address, an installation location, information on a person in charge of management, information of a user (a user name, a user ID, a password, and the like) for which authority to use is registered, a serial number, a MAC address of a network interface, and the like of the child device 2 are stored for each child device 2.

In order to increase confidentiality of information communicated between the parent device and the child device, an encryption key that is set in advance between the parent device and the child device may be stored, and information encrypted with the encryption key may be transmitted.

Although virus scanning information to be described later is encrypted in an example to be described later, print data itself may be encrypted.

When a "public key cryptosystem" in which encryption is performed using a public key and a private key is used, for example, a "private key of a parent device" and a "public key of a parent device" generated in the parent device 1 are stored in the parent device 1, and a public key of a parent device" is stored in the child device 2.

The "public key of the parent device" may be transmitted from the parent device 1 to the child device 2 by predetermined communication with high confidentiality, or may be stored in the child device 2 by another method.

Further, the "private key of the child device" and the "public key of the child device" generated in the child device 2 may be stored in the child device 2, and the "public key of the child device" may be stored in the parent device 1.

In the public key cryptosystem, for example, a transmission file is encrypted using a "public key" of the other party, the encrypted transmission file is transmitted to an apparatus of the other party, and the apparatus of the other party that has received the encrypted transmission file decrypts the encrypted transmission file using its own "private key" and acquires the decrypted transmission file itself.

On the other hand, after the transmission file is encrypted using its own "private key", the encrypted transmission file is transmitted to the apparatus of the other party, and the apparatus of the other party that has received the encrypted transmission file decrypts the encrypted transmission file using the "public key" of the transmission source apparatus which is stored in advance and acquires the decrypted transmission file itself.

In the present disclosure, in principle, the print data transmitted from the information creating apparatus 3 to the parent device 1 is temporarily stored in the parent device 1, and when the print data requested by the child device 2 is temporarily stored in the parent device 1, the temporarily stored print data is transmitted from the parent device 1 to the child device 2, and the child device 2 that has received the print data prints the received print data on a predetermined print sheet.

Further, the parent device 1 has a computer virus infection countermeasure function, and executes virus scanning processing on all pieces of print data transmitted from the information creating apparatus 3.

The child device 2 may or may not have a computer virus infection countermeasure function.

In the virus scanning processing, virus detection processing is performed using, for example, the latest virus scanning engine and the latest virus pattern file, and isolation processing or deletion processing of print data in which virus has been detected, virus removal processing, log storage of virus detection information, processing for notifying an administrator of virus detection, and the like are performed.

It is preferable that the print data isolated in the parent device 1 be not included in a job list, which is to be described later, requested by the child device 2, and be not transmitted from the parent device 1 to the child device 2.

Alternatively, when transmission of the job list is requested by the child device 2, the job list to be transmitted to the child device 2 includes a file name of only print data not infected with a virus, but the child device 2 may be notified of a file name of print data infected with a virus, and the like, separately from the job list.

When transmission of desired print data is requested by the child device 2 and the requested print data is infected with a virus, the child device may be notified that the print data has been infected with a virus without transmitting the print data itself to the child device.

Configuration of Image Forming Apparatus: Parent Device

Figure 4:
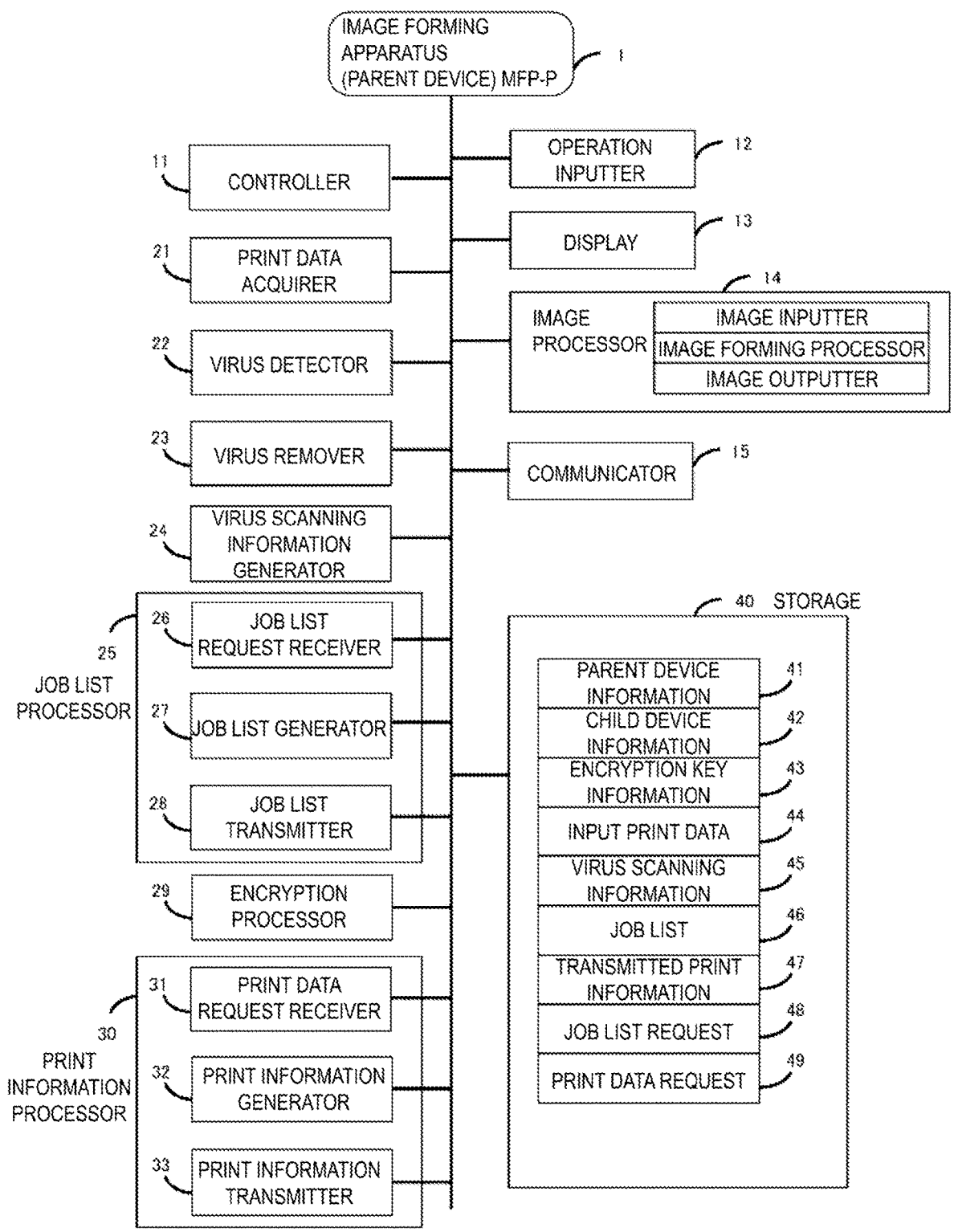
FIG. 4 is a configuration block diagram of an example of an image forming apparatus (parent device) according to the present disclosure.

FIG. 4 is a configuration block diagram of an example of the image forming apparatus (parent device) according to the present disclosure.

The image forming apparatus (parent device) 1 is electronic equipment that has functions of processing image data, such as a copying function, a printing function, a document reading (scanning) function, a document editing function, a document storing function, a document transmitting (fax, scanner, internet fax) function, a communication function.

As described above, the parent device 1 has a function of receiving and temporarily storing print data transmitted from the information creating apparatus 3.

In the following example, the image forming apparatus 1 according to the present disclosure will be described on the assumption that the image forming apparatus has a printing function and a document reading function, but may have other functions.

In FIG. 4, the parent device (MFP-P) 1 mainly includes a controller 11, an operation inputter 12, a display 13, an image processor 14, a communicator 15, a print data acquirer 21, a virus detector 22, a virus remover 23, a virus scanning information generator 24, a job list processor 25, an encryption processor 29, a print information processor 30, and a storage 40.

Here, as will be described later, the image processor 14 mainly includes an image inputter, an image forming processor, and an image outputter.

The job list processor 25 is a functional block that processes a list of print data (referred to as a job list) temporarily stored in the storage 40 of the parent device, and includes a job list request receiver 26, a job list generator 27, and a job list transmitter 28.

The print information processor 30 is a functional block for processing print information including data to be printed, and includes a print data request receiver 31, a print information generator 32, and a print information transmitter 33.

The controller 11 is a part that controls operations of components such as the display 13 and the image processor 14, and is mainly realized by a microcomputer including a CPU, a ROM, a RAM, an I/O controller, a timer, and the like.

The CPU organically operates various types of hardware based on a control program stored in advance in a nonvolatile memory such as a ROM to execute an image forming function, a virus detection function, and the like according to the present disclosure.

Among the above-described components, the virus detector 22, the virus remover 23, the virus scanning information generator 24, the job list generator 27, the encryption processor 29, the print information generator 32, and the like are functional blocks in which the CPU executes respective processes based on a predetermined program.

The operation inputter 12 is an input device for a user of the parent device 1 to perform a predetermined input operation. For example, the operation inputter 12 is a part for inputting information such as characters and selectively inputting a function; a keyboard, a mouse, a touch panel, or the like being used therefor.

Keys to be operated by the user include an operation start key, a function selection key, and a setting key.

For example, the user operates a touch panel or a start key for a reading operation to read a document, or operates a transmission start key for starting transmission of information such as image data to start an operation of transmitting information to a predetermined destination.

The display 13 is a part that displays information, and displays information necessary for execution of each function, results of execution of functions, and the like in order to notify the user thereof. For example, in a case where an LCD, an organic EL display, or the like is used and a touch panel is used as the operation inputter 12, the display 13 and the touch panel are disposed to overlap each other.

On the display 13, for example, settings of setting items used for printing of the image forming apparatus, information necessary for executing a document reading function or the like, an operation screen of a selected function, and the like are displayed using characters, symbols, figures, images, icons, animations, moving images, and the like.

In the present disclosure, for example, when a virus has been detected, a detection notification screen indicating that the virus has been detected, a file name of print data in which the virus has been detected, a warning screen indicating isolation of the print data, or the like, and the like may be displayed on the display 13.

The image processor 14 is a part that executes an image forming function, which is a main function of the parent device 1, and mainly includes an image inputter, an image forming processor, and an image outputter.

Mainly, the image inputter is a part that inputs predetermined image data, the image forming processor is a part that converts the input image data into information that can be printed or the like, and the image outputter is a part that outputs the formed print information or the like on a print sheet or the like.

The image inputter is a part that inputs image data of a document in which images, characters, figures, or the like are depicted, such as print data intended to be printed, and is, for example, a part that reads a document placed on a document table or the like.

As the image inputter, a scanner (reading apparatus) that reads a document having information written thereon is used.

In order to read a document, the parent device 1 includes a document placement table (document table) on which a document is placed and a document cover that holds the document.

The parent device 1 may include an automatic document feeder (ADF) in which a plurality of documents are placed and which automatically conveys and reads the plurality of documents one by one.

There are various methods of inputting image information. For example, a document having an image or the like written thereon is read by a scanner, and image data of the document (hereinafter, referred to as input image data) is stored in the storage 40.

For example, an interface to which an external storage medium such as a USB memory is connected corresponds to the image inputter.

An electronic data file such as image information desired to be input may be stored in an external storage medium such as a USB memory, the USB memory or the like may be connected to an input interface such as a USB terminal, and the operation inputter 12 may perform a predetermined input operation to read out the desired electronic data file stored in the USB memory or the like and store the electronic data file in the storage 40 as input image data.

For example, when print data is printed on a recording medium, the image forming processor generally forms the print data on the recording medium by continuously performing steps of charging, exposure, development, transfer, cleaning, static elimination, and fixing.

In the development step, a toner is supplied from a toner cartridge to a developing device, an electrostatic latent image formed on the surface of a charged photosensitive drum is developed, and a toner image corresponding to the electrostatic latent image is formed. The toner image formed on the surface of the photosensitive drum is transferred onto the recording medium by a transfer device, and then fixed onto the recording medium by being heated by a fixing device. The image forming processor also converts the input image data into information in a form that can be transferred or displayed.

The image outputter is a part that outputs the formed input image data and is equivalent to, for example, a printer.

However, the output of the input image data is not limited to printing, but also includes storage of the input image data of the scanned document, FAX transmission of the input image data of the scanned document, and the like.

For example, storing input image data of a read document in an external storage medium such as a USB memory, transmitting the input image data to another information processing apparatus or a server via a network such as the Internet, classifying and storing the input image data in a specific storage folder, and the like are equivalent to the image output.

The communicator 15 performs data communication with another communication device via the network 4.

For example, as illustrated in FIG. 1, the parent device (MFP-P) 1 is connected to the child device (MFP-C) and the information creating apparatus (PC) 3 via the network 4, and data communication is performed.

The parent device (MFP-P) 1 receives, for example, print data and the like transferred from the information creating apparatus (PC) 3 by the communicator 15.

Alternatively, the parent device (MFP-P) 1 receives a job list request or a print data request transmitted from the child device (MFP-C), and transmits a job list or print information generated in the parent device (MFP-P) 1 to the child device (MFP-C).

The print data acquirer 21 is a part that acquires print data and the like transmitted from the information creating apparatus (PC) 3 via the network 4.

The acquired print data is temporarily stored in the storage 40 as input print data 44.

In principle, the input print data 44 is deleted from the storage 40 of the parent device after being requested by the child device 2 and transferred to the child device.

The virus detector 22 is one of the infection countermeasure functions, and is a part that executes predetermined infection countermeasure processing on the stored input print data 44 and detects computer viruses.

The infection countermeasure processing includes virus scanning processing for detecting known computer viruses using a predetermined virus scanning engine and a predetermined virus pattern file, and the virus scanning processing is performed to check whether the stored input print data 44 has been infected with a virus.

The virus scanning processing is performed using at least the virus scanning engine and the virus pattern file, and it is preferable to use the latest versions of the virus scanning engine and the virus pattern file at all times in order to minimize virus detection oversights.

The latest virus scanning engine and virus pattern file can be acquired, for example, by periodically accessing a predetermined infection countermeasure management server.

It is assumed that the acquired virus scanning engine is provided with the name of the scanning engine (scanning engine name) and version information of the scanning engine (engine version), and the acquired virus pattern file is provided with version information of the pattern file (pattern version) and date information on the acquisition of the virus pattern file (scanning pattern acquisition date).

The scanning pattern acquisition date may be the date on which the virus pattern file is acquired, or may be the date on which the virus pattern file is created in the infection countermeasure management server.

The virus remover 23 is a part that removes the input print data 44 infected with a virus, and may isolate the infected input print data 44 in a quarantine area of the storage 40 that is normally inaccessible.

When a virus can be removed from the input print data, the virus may be removed, and virus-free input print data may be stored.

In order to prevent infection from spreading, it is preferable that the removed input print data 44 and the isolated input print data 44 be not transmitted to the child device 2 even when there is a transmission request from the child device 2.

The virus scanning information generator 24 is a part that generates virus scanning information when virus scanning processing is executed.

The virus scanning information is information for specifying a setting item related to the infection countermeasure processing (for example, virus scanning processing) executed in the parent device 1.

The virus scanning information includes at least the name of a virus scanning engine (scanning engine name), version information (engine version) of the virus scanning engine, version information (pattern version) of a virus pattern file, and date information on the acquisition of the virus pattern file (scanning pattern acquisition date).

Alternatively, the virus scanning information may include information for identifying the parent device 1 that has executed the virus scanning processing (for example, a parent device ID), and may further include a date on which the parent device 1 has executed the virus scanning processing (execution date), and the like.

Further, the virus scanning information generator 24 adds the generated virus scanning information to the print data on which the virus scanning processing has been executed. However, since the print data in which a virus has been detected is isolated or removed after the virus scanning processing is executed, in the following example, the virus scanning information generator 24 adds the virus scanning information to the print data in which the virus scanning processing has been executed by the virus detector 22 and no computer virus has been detected.

Thus, the print data having the virus scanning information added thereto is guaranteed that the virus scanning processing has been executed and no virus has been detected, and further, information on the used virus scanning engine and virus pattern file can be known by confirming the content of the virus scanning information.

For example, by checking the pattern version and the scanning pattern acquisition date in the virus scanning information, it is possible to determine whether the virus scanning processing has been executed using the latest virus pattern file among the currently available virus pattern files.

On the other hand, print data to which no virus scanning information has been added is data on which virus scanning processing has not yet been executed, is data for which it is unclear whether the print data has been infected with a virus, and is hereinafter referred to as an unscanned job.

In the following example, it is assumed that print data having virus scanning information added thereto is transmitted to the child device 2.

On the other hand, print data having no virus scanning information added thereto may or may not be transmitted to the child device 2.

As described above, the job list processor 25 is a part that processes a list of print data (referred to as a job list) temporarily stored in the storage 40 of the parent device, and includes a job list request receiver 26, a job list generator 27, and a job list transmitter 28.

For example, when the parent device 1 receives a job list request transmitted from the child device 2, the job list processor 25 generates a job list including the name of print data requested according to the job list request among pieces of print data temporarily stored in the storage 40 of the parent device 1 and also including virus scanning information when the requested print data is print data to which virus scanning information is added, and transmits the generated job list to the child device 2 that has transmitted the job list request.

The job list request receiver 26 is a part that receives a job list request transmitted from the child device 2.

The job list request is information for requesting transmission of a list (job list) of print data temporarily stored in the storage 40 of the parent device 1 to the child device 2.

Since a large number of pieces of print data created by different users may be stored as the print data temporarily stored in the parent device 1, the job list request includes a user name, and a list of print data specified by the user name among the plurality of pieces of print data temporarily stored is requested.

When the job list request has been received, the job list generator 27 is a part that generates a list (job list) including the name of print data requested by the job list request.

The job list includes at least a print data name for specifying the requested print data.

However, when the requested print data has been subjected to virus scanning processing and has virus scanning information added thereto, the virus scanning information is also included in the job list.

The job list does not include the file itself including the content of the print data.

Since the job list request includes a user name of a user who requested the list of the print data, the input print data including the user name is selected from among the large number of pieces of input print data 44 temporarily stored in the storage 40, and when virus scanning information is added to the selected input print data, the virus scanning information is also acquired to generate a job list.

For example, a job list as illustrated in FIG. 6 to be described later is generated.

The job list transmitter 28 is a part that transmits the generated job list to the child device 2 that has transmitted the job list request.

In the child device 2 having received the job list, the job list is displayed on a display of the child device 2, and a print data name desired by the user who requested the job list is selected from among print data names displayed in the job list.

The encryption processor 29 is a part that encrypts the generated virus scanning information with a predetermined encryption key (referred to as a first encryption key).

Alternatively, the print data itself to be transmitted to the child device may be encrypted. As described above, the encryption may be performed by the "public key cryptosystem" determined in advance between the parent device and the child device. For example, virus scanning information may be encrypted with a private key of the parent device, and virus scanning information may be encrypted with a public key of the child device.

When the virus scanning information is encrypted, the virus scanning information generator 24 adds the encrypted virus scanning information (referred to as encrypted virus scanning information) to the print data.

Note that the encryption of the virus scanning information is not essential, and the encryption is executed when the confidentiality of information to be communicated is increased. Whether to perform encryption may be set in advance in the parent device.

Whether to encrypt the print data itself may be set in advance in the parent device.

As described above, the print information processor 30 is a part that processes print information including data to be printed, and includes a print data request receiver 31, a print information generator 32, and a print information transmitter 33.

The print data request receiver 31 is a part that receives a print data request transmitted from the child device 2.

When a user viewing the displayed job list selects a print data name of print data desired to be printed in the child device 2, information for requesting transmission of the selected print data (print data request) is transmitted to the parent device 1.

Since the print data name is included in the received print data request, a file of print data having the print data name is searched for from the stored input print data 44.

The print information generator 32 is a part that generates print information including the print data requested by the child device 2 among the acquired and temporarily stored print data.

In the print data request received from the child device as described above, print information is generated in order to transmit the requested print data itself to the child device 2.

The parent device 1 having received the print data request acquires the file of the print data itself having the requested print data name from among the input print data 44 temporarily stored in the storage 40 and generates print information including the acquired file of the print data.

The print information generated here is referred to as transmitted print information.

When virus scanning information is added to the acquired print data, the virus scanning information is also included in the transmitted print information.

The print data requested by the child device 2 may be data to which virus scanning information is added or data to which virus scanning information is not added yet.

Since the print data having the virus scanning information added thereto is print data in which no virus has been detected and is less likely to be infected with a virus, print information including only print data requested by the child device 2 and having virus scanning information added thereto may be generated in order to reduce the risk of infection of the child device.

The transmitted print information is, for example, information illustrated in FIG. 6 to be described later.

The print information transmitter 33 is a part that transmits the generated transmitted print information to the child device 2 that has transmitted a print data request.

Here, when the print data requested by the child device 2 has been subjected to virus scanning processing and has virus scanning information added thereto, transmitted print information including a file of the print data and the virus scanning information is transmitted.

On the other hand, when the print data requested by the child device 2 has not yet been subjected to virus scanning processing, virus scanning information is not added thereto, and thus transmitted print information including a file of the print data is transmitted.

The child device 2 having received the transmitted print information can determine whether the received print data has been subjected to virus scanning processing based on the presence or absence of virus scanning information.

For example, as will be described later, when virus scanning information is included in the received transmitted print information, virus scanning processing has been executed and no virus has been detected, and thus the received print data can be determined to be safe and printed.

On the other hand, when virus scanning information is not included in the transmitted print information received in the child device 2, virus scanning processing is not executed, and thus it can be determined that it is unclear whether the received print data is safe, and the received print data need not be printed.

Alternatively, when the child device 2 has an infection countermeasure function, virus scanning processing may be executed on print data that does not include virus scanning information, print data in which no virus has been detected may be printed, and print data in which a virus has been detected need not be printed but may be isolated.

The storage 40 is a part that stores information and programs necessary for executing each function of the image processing apparatus MFP of the present disclosure, and a semiconductor memory element such as a ROM, a RAM, or a flash memory, a storage device such as an HDD or an SSD, or another storage medium is used.

The storage 40 stores, for example, parent device information 41, child device information 42, encryption key information 43, input print data 44, virus scanning information 45, a job list 46, transmitted print information 47, a job list request 48, a print data request 49, and the like. FIG. 6 is a diagram illustrating an example of information stored in the storage 40 of the image forming apparatus (parent device).

The parent device information 41 is information related to the parent device 1, and for example, as illustrated in FIG. 6, information for identifying the parent device (parent device name, parent device ID) and information for connecting to the parent device 1 via a network (IP address) are stored in advance.

However, the information related to the parent device 1 is not limited thereto, and for example, information such as a machine serial number and a MAC address of a network interface may be stored.

The child device information 42 is information related to the child device 2, and for example, as illustrated in FIG. 6, information for identifying the child device (child device name, child device ID) and information for connecting to the child device 2 via a network (IP address) are stored in advance.

However, the information related to the child device 2 is not limited thereto, and for example, information such as a machine serial number and a MAC address of a network interface may be stored.

The encryption key information 43 is information for encrypting and decrypting information communicated between the parent device and the child device.

For example, as illustrated in FIG. 6, there are a parent device private key (OYASCK) and a parent device public key (OYAPUK) as encryption keys generated and stored in the parent device 1, and there is a child device public key (KOPUK) as an encryption key acquired from the child device 2.

The input print data 44 is print data transmitted from the information creating apparatus (PC) 3 to the parent device 1 and acquired.

Assuming that the information creating apparatus (PC) 3 is a user terminal owned by a specific user, when print data is transmitted to the parent device 1, information for identifying the user or the information creating apparatus (PC) may be added to the print data.

In this case, as the input print data 44, a file name and a user name or a PC name are stored in association with the print data file itself.

For example, as illustrated in FIG. 6, the file name and the user name of the print data are associated with each other and stored as the input print data 44.

When print data is transmitted from the information creating apparatus (PC) 3 to the parent device 1, predetermined user authentication processing may be performed, the print data may be transmitted to the parent device 1 after the user authentication has been successful, and the file name of the received print data may be stored as the input print data 44 in association with the user name of the user who has succeeded in the user authentication.

Although FIG. 6 illustrates only one example of print data, a large number of pieces of input print data 44 in which a file name and a user name of the print data are associated with each other are temporarily stored in the storage 40.

As described above, the virus scanning information 45 is information (SC) related to the virus scanning processing executed in the parent device 1, and is generated, for example, when the virus scanning processing is executed, and the virus scanning information is added to print data in which virus scanning processing has been executed and no virus has been detected. As illustrated in FIG. 6, the virus scanning information (SC) 45 includes, for example, a scanning engine name, an engine version, a pattern version, a scanning pattern acquisition date, and a parent device ID.

By transmitting a job list including a print data name and the virus scanning information 45 to the child device 2, the child device 2 can confirm whether the print data is print data in which virus scanning processing has been executed in the parent device and no virus has been detected.

Further, by confirming contents such as the pattern version and the scanning pattern acquisition date of the received virus scanning information in the child device 2 having an infection countermeasure function, it is possible to further determine whether virus scanning processing should be executed in the child device 2.

The job list 46 is a list of print data temporarily stored in the storage 40 of the parent device, and the job list 46 is generated as a response to a job list request received from the child device 2 and transmitted to the child device 2.

As described above, when the job list request transmitted from the child device 2 includes a user name of a user who has made a request, a list of print data transmitted from the user terminal PC to the parent device 2 by the user is generated.

That is, the file name (print data name) of the print data associated with the user name of the requesting user among the input print data 44 is acquired and included in the job list.

For example, as illustrated in FIG. 6, the job list 46 includes a print data name, virus scanning information, transmission source parent device information, and transmission destination child device information.

However, when print data having not been subjected to virus scanning processing is included in the job list, the virus scanning information is not included in the job list 46.

Although the job list 46 illustrated in FIG. 6 includes three print data names: print data "PRINT01" and "PRINT02" are data having been subjected to virus scanning processing due to having virus scanning information, but print data "PRINT03" is data having not been subjected to virus scanning processing due to not having virus scanning information.

The information included in the job list 46 is not limited to these pieces of information, and may include the name of a user who has requested the job list, the date and time when the job list has been requested, and the like.

As described above, the transmitted print information 47 is information generated by the print information generator 32, and is print information including print data itself requested by the child device 2.

For example, as illustrated in FIG. 6, the transmitted print information 47 includes transmission source parent device information, transmission destination child device information, a print data name, and a print file which is an entity of the print data, and also includes virus scanning information when virus scanning processing is executed on the print data.

The job list request 48 is information transmitted from the child device 2, and includes, for example, transmission destination parent device information, transmission source child device information, and a user name as illustrated in FIG. 6.

As described above, a job list is generated using the user name.

The print data request 49 is information transmitted from the child device 2, and includes, for example, transmission destination parent device information, transmission source child device information, and a print data name as illustrated in FIG. 6.

Transmitted print information is generated using the print data name included in the print data request.

Configuration of Image Forming Apparatus: Child Device

Figure 5:
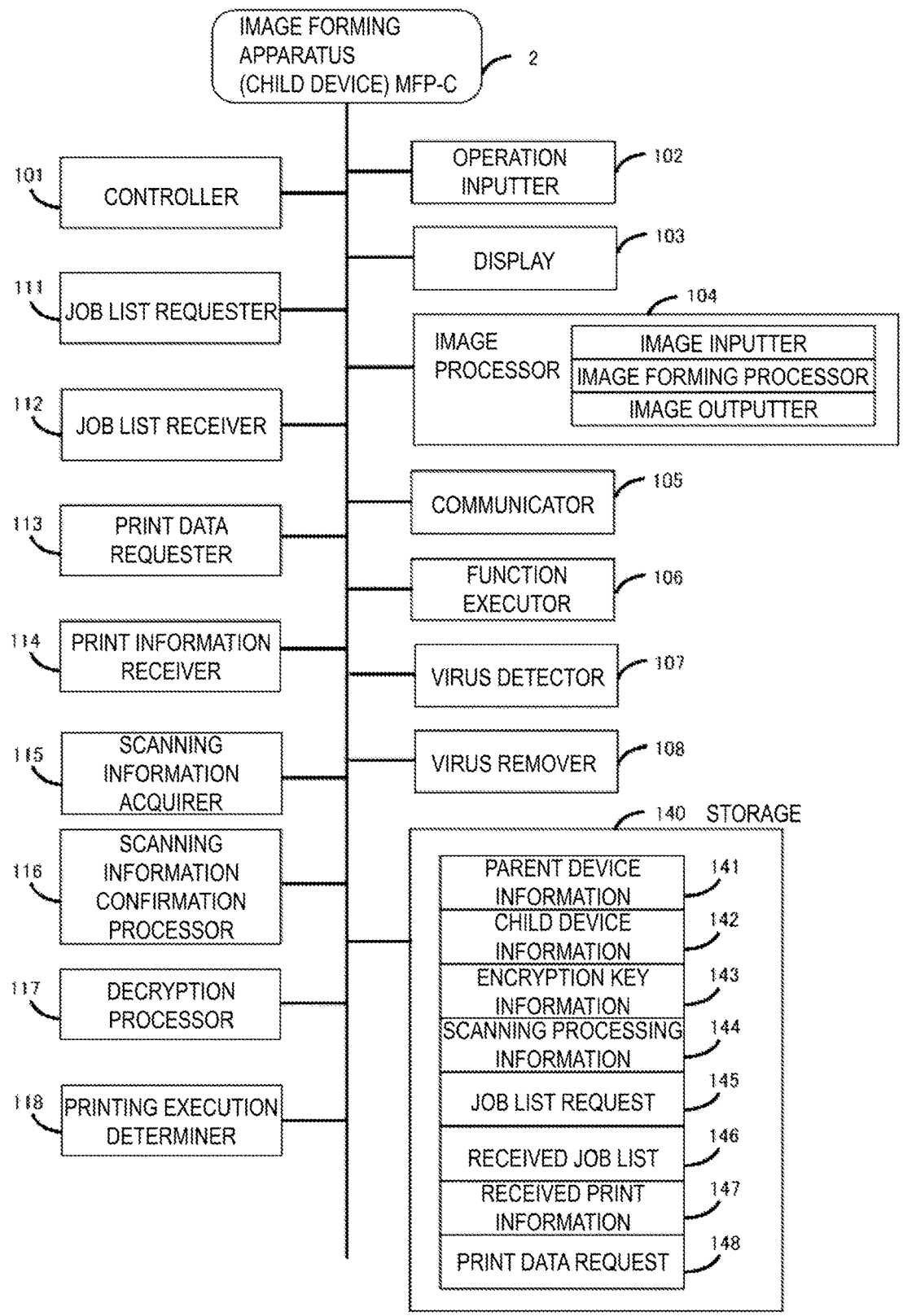
FIG. 5 is a configuration block diagram of an example of an image forming apparatus (child device) according to the present disclosure.

FIG. 5 is a configuration block diagram illustrating an example of the image forming apparatus (child device) according to the present disclosure.

Similar to the parent device 1, the image forming apparatus (child device) 2 is also electronic equipment that has a function of processing image data, such as a copying function, a printing function, a document reading (scanning) function, a document editing function, a document storing function, a document transmitting (fax, scanner, internet fax) function, a communication function.

In FIG. 5, the image forming apparatus (child device) 2 of the present disclosure mainly includes a controller 101, an operation inputter 102, a display 103, an image processor 104, a communicator 105, a virus detector 107, a virus remover 108, a function executor 106, a job list requester 111, a job list receiver 112, a print data requester 113, a print information receiver 114, a scanning information acquirer 115, a scanning information confirmation processor 116, a decryption processor 117, a printing execution determiner 118, and a storage 140.

Here, similar to the parent device 1, the image processor 104 mainly includes an image inputter, an image forming processor, and an image outputter.

In the child device 2, only when the child device 2 has the infection countermeasure function, the virus detector 107 and the virus remover 108 are provided, and virus scanning processing is executed. However, when the child device 2 does not have the infection countermeasure function, the virus detector 107 and the virus remover 108 are not provided, and virus scanning processing is not executed.

The controller 101 is a part that controls the operation of each component such as the display 103 and the image processor 104, and is mainly realized by a microcomputer including a CPU, a ROM, a RAM, an I/O controller, a timer, and the like.

The CPU organically operates various types of hardware based on a control program stored in advance in a nonvolatile memory such as a ROM to execute an image forming function, a job list request function, and the like of the child device 2.

Among the above-described components, the virus detector 107, the virus remover 108, the scanning information acquirer 115, the scanning information confirmation processor 116, the decryption processor 117, the printing execution determiner 118, and the like are functional blocks in which a CPU executes each of respective processing based on a predetermined program.

Among the functional blocks of the child device 2, the operation inputter 102, the display 103, the image processor 104, and the communicator 105 are parts that perform the same processing as the functional blocks included in the parent device 1, respectively, and thus description thereof is omitted.

The function executor 106 is a part that executes functions that can be executed in the child device 2.

For example, when a user performs a predetermined input operation of executing a copy function using the operation inputter 102 of the child device 2, the same content as a document is copied onto a predetermined print sheet.

When a predetermined input operation for printing desired print data is performed, the print data is printed on a predetermined print sheet.

When the printing execution determiner 118 to be described below determines that the print data is to be printed, the print data is printed.

Similar to the virus detector 22 of the parent device 1, the virus detector 107 is one of the infection countermeasure functions, and is a part that checks whether the print data included in the received print information 147 has been infected with a virus.

For example, infection countermeasure processing including virus scanning processing for detecting known computer viruses is executed on the received print data using a virus scanning engine and a virus pattern file, thereby detecting a computer virus.

Virus scanning processing performed in the child device is also performed using at least a virus scanning engine and a virus pattern file, and it is preferable to acquire the latest virus scanning engine and virus pattern file, for example, by periodically accessing a predetermined infection countermeasure management server.

It is assumed that the acquired virus scanning engine is provided with the name of the scanning engine (scanning engine name) and version information of the scanning engine (engine version), and the acquired virus pattern file is provided with version information of the pattern file (pattern version) and date information on the acquisition of the virus pattern file (scanning pattern acquisition date).

These pieces of information (the name and version information of the virus scanning engine, the version information of the virus pattern file, and date information on the acquisition of the virus pattern file) are stored in the storage 140 as scanning processing information 144 to be described later.

Similar to the virus remover 23 of the parent device 1, the virus remover 108 is a part that removes print data infected with a virus, and the infected print data may be isolated in a quarantine area of the storage 140 that is normally inaccessible.

The job list requester 111 is a part that transmits a job list request to the parent device 1.

The job list request is transmitted when the user of the image forming apparatus intends to print the print data stored in the parent device 1 in the child device 2.

As described above, the job list request is information for requesting transmission of a list of print data (job list) temporarily stored in the storage 40 of the parent device 1 to the child device 2.

When the user of the image forming apparatus transmits information such as image data or a document created by the user themselves to the parent device 1 and then desires to print desired information in the child device 2 in an office to which the user belongs, the user performs a predetermined input operation in the child device 2 in order to display a list of information stored in the parent device 1. For example, in the child device 2, when the user inputs a user name and performs a key input corresponding to a list display request for their own information after predetermined user authentication processing has been successful, a job list request including the user name is created and transmitted to the parent device 1.

The job list receiver 112 is a part that receives the job list transmitted from the parent device 1.

As described above, in the parent device 1 that has received the job list request, the job list including the print data name of the print data corresponding to the requested user is generated and transmitted to the child device 2.

In the child device 2, when the job list receiver 112 has received the job list, the received job list is displayed on the display 103 of the child device 2.

For example, as illustrated in FIG. 8 to be described later, a list (print job list) of print data names included in the job list is displayed.

In addition to the print data name, the received job list includes virus scanning information when virus scanning processing is executed, and thus information indicating whether the virus scanning processing has been executed may also be displayed.

When a plurality of print data names are included in the received job list, it is preferable to display the print data names so that the user can select print data desired to be printed.

FIG. 8 illustrates an example of a display screen (G1) of the print job list displayed on the display 103 of the child device 2.

Here, a case where five pieces of print data are included in the received job list is illustrated, and the print job list in which a print data name, "printing selected/not selected", and "unscanned/scanned" are displayed in association with each other is illustrated.

"Unscanned/scanned" is a field in which corresponding print data indicates whether virus scanning processing has been executed in the parent device.

For example, in FIG. 8, when "○" is displayed in the field of "unscanned/scanned", it means that virus scanning processing has been executed on the corresponding print data and no virus has been detected.

On the other hand, in a case where "-" is displayed in the field of "unscanned/scanned", it means that virus scanning processing has not been executed on the corresponding print data in the parent device, and it is unclear whether the print data has been infected with a virus.

"Printing selected/not selected" is a field in which a user inputs whether to select printing of the corresponding print data.

When an input operation for selecting the corresponding print data is performed, a mark (for example, ○ or a check mark) indicating that printing has been selected is displayed in this field.

When nothing is displayed in the field of "printing selected/not selected", it means that the corresponding print data has not been selected.

In a print job list display screen G1 of FIG. 8, two pieces of print data (PDT001 and PDT050) with "○" displayed in the field of "printing selected/not selected" are selected as printing targets.

In this display state, when an input for selecting a region displayed as "print" in the display screen G1 is performed, processing for requesting the parent device 1 to transmit the two pieces of print data having the print data names (PDT001, PDT050) is executed in the child device 2.

In the print job list display screen G1 of FIG. 8, three pieces of print data (PDT001, PDT002, PDT050) with "○" displayed in the field of "unscanned/scanned" are data on which virus scanning processing has been executed in the parent device, and two pieces of print data (PDT111, PDT200) with "-" displayed in the field of "unscanned/scanned" are data on which virus scanning processing has not been executed in the parent device.

Although not illustrated in FIG. 8, detailed contents of virus scanning processing may be displayed for the print data for which the virus scanning processing has been executed in the parent device.

For example, when a display region of the print data name is selected and input on the display screen of FIG. 8, a scanning information details display screen (G2) as illustrated in FIG. 9 may be displayed.

FIG. 9 is a diagram illustrating an example of the scanning information details display screen (G2).

In FIG. 9, detailed contents of scanning information include a print data name, printing selected/not selected, unscanned/scanned, a scanning parent device name, a scanning engine name, a scanning engine version, a scanning pattern version, and a scanning pattern acquisition date.

By viewing the display screen G2, it is possible to confirm which parent device has executed virus scanning processing with which engine and pattern.

The print data requester 113 is a part that requests the parent device 1 to transmit predetermined print data among the print data temporarily stored in the parent device 1 to the child device, and transmits a print data request to the parent device 1.

The print data request is transmitted when the user of the image forming apparatus selects desired print data and performs an input operation for executing printing.

As described above, the print data request is information including a print data name and for requesting the transmission of print data having the print data name to the child device 2.

For example, as described above, when an input for selecting a region displayed as "print" on the display screen G1 in FIG. 8 is performed, a print data request including the print data name of the selected print data is generated and transmitted to the parent device 1.

The print information receiver 114 is a part that receives print information transmitted from the parent device 1.

The parent device 1 having received the print data request searches for print data having a print data name included in the print data request from the storage 40 of the parent device 1, generates the transmitted print information 47 including a print file that is an entity of the print data, and transmits the generated transmitted print information 47 to the child device 2. The child device 2 receives the transmitted print information 47 and stores the transmitted print information 47 in the storage 140 as received print information 147.

The received print information 147 has the same configuration as that of the transmitted print information 47, but includes a print data name, a print file, virus scanning information, and the like as illustrated in FIG. 7 to be described later.

The scanning information acquirer 115 is a part that acquires virus scanning information included in the information transmitted from the parent device.

For example, when virus scanning information is included in a received job list, the virus scanning information is acquired.

The virus scanning information is used when the display screens illustrated in FIGS. 8 and 9 are displayed.

When print information has been received, virus scanning information added to print data included in the received print information is acquired.

As will be described later, the virus scanning information is used to determine whether print data can be printed, a scanning pattern acquisition date is compared and confirmed, and whether virus scanning processing can be executed in the child device.

The scanning information confirmation processor 116 is a part that confirms the contents of the acquired virus scanning information.

Here, it is confirmed whether virus scanning information is included in the received information in association with a print data name.

As will be described later, it may be determined whether printing is executable in accordance with the presence or absence of virus scanning information.

In particular, when the child device does not have an infection countermeasure function and cannot execute virus scanning processing, it is determined whether printing is executable in accordance with the presence or absence of virus scanning information in received information.

When virus scanning information is included in the received print information, for example, a scanning pattern acquisition date of the received virus scanning information is compared with a scanning pattern acquisition date of the scanning processing information 144 stored in the storage 140 of the child device 2 to confirm which date is more recent.

By comparing the scanning pattern acquisition dates, it is possible to determine which of the virus scanning processing executed in the parent device and the virus scanning processing executed in the child device is appropriate processing.

In general, it can be said that virus scanning processing executed using a virus pattern file having a more recent scanning pattern acquisition date is more appropriate processing because there is a high possibility that a more recently occurring virus can also be detected.

For example, when the scanning pattern acquisition date of the received virus scanning information is more recent than the scanning pattern acquisition date of the stored scanning processing information 144, or when both the dates are the same, it is determined that the virus scanning processing executed in the parent device is more appropriate than the virus scanning processing executed in the child device.

On the other hand, when the scanning pattern acquisition date of the received virus scanning information is less recent than the scanning pattern acquisition date of the stored scanning processing information 144, it is determined that the virus scanning processing executed in the child device is more appropriate than the virus scanning processing executed in the parent device.

In this case, even when the virus scanning processing is executed in the parent device, it is preferable that the virus scanning processing be executed in the child device by using the virus scanning engine and the virus pattern file stored in the child device.

In order to confirm the content of the virus scanning information, not only the scanning pattern acquisition date but also the engine version of the virus scanning engine or the pattern version of the virus pattern file may be used.

When the engine version or the pattern version is used, it is confirmed which one of the version of the received virus scanning information and the version of the stored scanning processing information 144 is newer or older, and thus it can be determined which of the parent device and the child device performs appropriate virus scanning processing.

The decryption processor 117 is a part that decrypts information transmitted from the parent device with a predetermined encryption key (referred to as a second encryption key).

For example, when virus scanning information is encrypted in the parent device, the encrypted virus scanning information is decrypted with a predetermined encryption key.

The decryption is performed by an encryption method determined in advance between the parent device and the child device, and the decryption is performed using an encryption key stored in advance in the child device.

After the encrypted virus scanning information added to the print data included in the print information received by the print information receiver 114 is decrypted by the decryption processor 117, the scanning information acquirer 115 acquires the decrypted virus scanning information as virus scanning information. Thereby, the original information that is not encrypted is acquired.

As will be described later, when virus scanning information is encrypted in the parent device using the private key of the parent device, the encrypted virus scanning information is decrypted in the child device using the public key of the parent device.

Alternatively, when virus scanning information is encrypted in the parent device using the public key of the child device, the encrypted virus scanning information is decrypted in the child device using the private key of the child device.

When not only the virus scanning information but also the print data is encrypted, the print data is also decrypted in the same manner.

Furthermore, when the decryption has not been successful in the decryption processing, that is, when the decrypted information is information in a format that cannot be recognized as virus scanning information, it can be determined that the received encrypted virus scanning information is invalid or is likely to be infected with a virus.

In this manner, when the decryption of the encrypted virus scanning information has not been successful (when decryption is not executable), the print data transmitted together with the virus scanning information is also considered to be unreliable. Thus, it is preferable that the received print data not be printed or isolated, or the virus scanning processing be executed when the virus scanning processing can be executed in the child device.

The printing execution determiner 118 is a part that determines whether to print the print data included in the received print information using the acquired virus scanning information.

The determination of whether to print the print data is mainly performed using the virus scanning information. For example, the determination of whether to print the file of the print data is performed in accordance with the presence or absence of virus scanning information. Whether to print the print data may be determined in accordance with not only whether there is virus scanning information but also using other conditions. As will be described later, the determination may be performed based on whether decryption is executable, the contents of the virus scanning information (for example, a scanning pattern acquisition date), a result of the execution of the virus scanning processing in the child device, and the like.

However, as will be described later, when virus scanning processing is executed in the parent device, and a job list including only print data in which no virus has been detected is transmitted to the child device, and when virus scanning processing is executed in the parent device, and transmitted print information including print data in which no virus has been detected and virus scanning information is transmitted to the child device, the print data received in the child device can be determined to be safe data which is not infected with a virus, and thus the print data may be printed without determining whether printing is executable.

For example, when print data having virus scanning information added thereto and print data having no virus scanning information added thereto are included in the print information received by the print information receiver 114, whether to print a file of the print data may be determined in accordance with whether virus scanning information is included.

In this case, the printing execution determiner 118 determines that the print data having the virus scanning information added thereto is to be printed, and determines that the print data having the virus scanning information not added thereto is not to be printed.

When the virus scanning information is added, the print data included in the received print information is data in which virus scanning processing has been executed in the parent device and no virus has been detected, the print data can be determined to be safe data which is not infected with a virus, and thus the print data may be printed.

On the other hand, when virus scanning information is not added, the print data included in the received print information is determined not to be printed because virus scanning processing has not been executed in the parent device and it is unclear whether the print data has been infected with a virus, and it cannot be determined that the print data is safe data.

When infection countermeasure processing (virus scanning processing) is executable in the child device, it may be determined whether the print data can be printed based on a result of the execution of the virus scanning processing in the child device in addition to whether there is virus scanning information.

In this case, first, when the virus scanning information is included in the received print information, the printing execution determiner 118 determines to print the print data.

On the other hand, when virus scanning information is not included, virus scanning processing is executed in the child device on the print data included in the received print information, and when no virus has been detected, it is determined that the print data is to be printed, but when a virus has been detected, it is determined that the print data is not to be printed.

Furthermore, in a case where virus scanning information is included in the received print information, the printing execution determiner 118 may compare the virus scanning information added to the received print data with the scanning processing information 144 stored in the storage 140 of the child device, determine that the received print data is to be printed when the virus scanning information is newer than the scanning processing information 144, and determine that the received print data is not to be printed when the virus scanning information is older than the scanning processing information 144.

In this case, for example, it may be determined whether printing is executable by comparing date information on the acquisition of the virus pattern file included in the virus scanning information added to the received print data with date information on the acquisition of the virus pattern file included in the scanning processing information 144 stored in the storage 140 of the child device.

When the date information on the acquisition of the received virus pattern file is newer than or the same as the date information on the acquisition of the virus pattern file included in the scanning processing information 144 stored in the storage 140 of the child device, it is determined that the print data is to be printed.

On the other hand, when the date information on the acquisition of the received virus pattern file is older than the date information on the acquisition of the virus pattern file included in the scanning processing information 144 stored in the storage 140 of the child device even when virus scanning information is included in the received print information, it is determined that the print data is not to be printed.

Alternatively, when infection countermeasure processing (virus scanning processing) can be executed in the child device, the virus detector 107 of the child device may execute infection countermeasure processing (virus scanning processing) on the print data determined not to be printed by the printing execution determiner 118, and the print data in which a computer virus has been detected need not be printed, but the print data in which a computer virus has not been detected may be printed.

In particular, when the scanning pattern acquisition date of the received virus scanning information is less recent than the scanning pattern acquisition date of the scanning processing information 144 stored in the storage 140 of the child device, virus scanning processing is executed on the print data included in the received print information in the child device, and it may be determined that the print data is to be printed when no virus has been detected, and the print data is not to be printed when a virus has been detected, instead of uniformly determining that the print data is not to be printed.

When the received virus scanning information has been encrypted, it may be determined whether printing is executable based on whether decryption is executable in the child device. That is, when the print information received by the print information receiver 114 includes print data having the encrypted virus scanning information added thereto, and the encrypted virus scanning information is decrypted by the decryption processor 117, the printing execution determiner 118 may determine that the print data having the encrypted virus scanning information added thereto is to be printed when the decryption is performed normally, and may determine that the print data having the encrypted virus scanning information added thereto is not to be printed when the decryption cannot be performed normally.

When the encrypted virus scanning information cannot be decrypted, virus scanning processing is executed on the print data included in the received print information in the child device, and it may be determined the print data is to be printed when no virus has been detected, but it may be determined that the print data is not to be printed when a virus has been detected.

Alternatively, when the encrypted virus scanning information can be decrypted, the scanning pattern acquisition dates may be compared and determined as described above.

In this case, when the scanning pattern acquisition date of the received virus scanning information is more recent than or the same as the scanning pattern acquisition date of the scanning processing information 144 stored in the storage 140 of the child device, it is determined that printing is to be performed, but when the scanning pattern acquisition date of the received virus scanning information is less recent than the scanning pattern acquisition date of the scanning processing information 144 stored in the storage 140 of the child device, it is determined that printing is not to be performed.

The above-described content of the determination of whether printing is executable is an example, and there are various determination patterns regarding whether printing is executable depending on determination conditions to be set.

Figure 11:
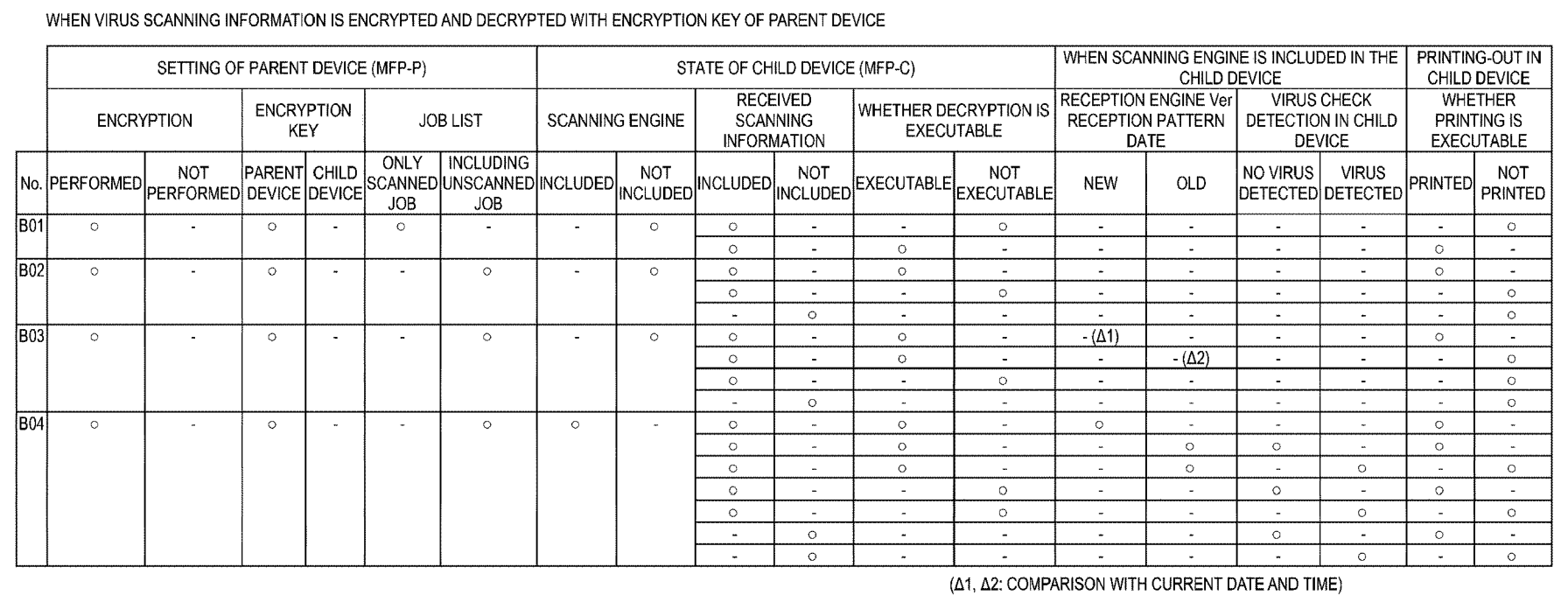

FIG. 10, FIG. 11, and FIG. 12, which will be described later, are diagrams illustrating examples of correspondence relationships between some setting conditions and whether printing is executable in the child device.

The storage 140 is a part that stores information and programs necessary for executing each function of the child device (MFP-C) 2, and a semiconductor memory element such as a ROM, a RAM, or a flash memory, a storage device such as an HDD or an SSD, or another storage medium is used.

The storage 140 stores, for example, parent device information 141, child device information 142, encryption key information 143, scanning processing information 144, a job list request 145, a received job list 146, received print information 147, a print data request 148, and the like.

FIG. 7 is a diagram illustrating an example of information stored in the storage 140 of the image forming apparatus (child device).

The parent device information 141 and the child device information 142 are respectively the same as the parent device information 41 and the child device information 42 stored in the storage 40 of the parent device 1 described above.

The encryption key information 143 is an encryption key based on an encryption method determined in advance between the parent device and the child device, and for example, a child device private key, a child device public key, and a parent device public key are stored.

The scanning processing information 144 is information stored when the child device 2 has an infection countermeasure function, and is information (SC) related to virus scanning processing executed in the child device 2.

As illustrated in FIG. 7, the virus scanning processing information 144 includes, for example, a scanning engine name, an engine version, a pattern version, and a scanning pattern acquisition date.

The job list request 145 and the print data request 148 are respectively the same as the job list request 48 and the print data request 49 stored in the storage 40 of the parent device 1 described above.

The received job list 146 corresponds to the job list 46 transmitted from the parent device 1, and the received print information 147 corresponds to the transmitted print information 47 transmitted from the parent device 1.

Example of Correspondence Relationship Between Setting Conditions when Virus Scanning Information is not Encrypted and Whether Printing is Executable in Child Device FIG. 10 is a diagram illustrating an example of a correspondence relationship between setting conditions when virus scanning information is not encrypted and whether printing is executable in the child device.

Here, the following matters are set as setting conditions for determining whether printing is executable.

(1) Whether to include only print data having been subjected to virus scanning processing in a job list or transmitted print information (2) Whether the child device has an infection countermeasure function (scanning engine)

(3) Whether to determine whether a scanning pattern acquisition date is recent or not (4) A result of execution of virus scanning processing in the child device (whether a virus has been detected)

It is also assumed that neither the parent device nor the child device encrypts or decrypts virus scanning information.

In FIG. 10, five printing possibility patterns (A01 to A05) are illustrated.

As a setting condition in the parent device (MFP-P), it is assumed that encryption is not performed and an encryption key is not stored.

It is assumed that a job list transmitted to the child device includes a case where only the name of print data on which virus scanning processing has been performed (scanned job) in the parent device and in which no virus has been detected is included and a case where not only the scanned job but also the name of print data on which virus scanning processing has not been performed (unscanned job) is included.

Further, it is assumed that there is a case where only print data on which virus scanning processing has been performed (scanned job) in the parent device is included and transmitted to the child device and a case where not only the scanned job but also print data on which virus scanning processing has not been performed (unscanned job) is included and transmitted to the child device.

As the state of the child device (MFP-C), since decryption is not performed, it is not determined whether decryption is executable, and it is assumed that the child device (MFP-C) may or may not include a scanning engine.

Further, when the child device (MFP-C) includes a scanning engine, it is assumed that the child device may or may not execute virus scanning processing, and may or may not determine whether a scanning pattern acquisition date is recent or not.

A01 in FIG. 10

For example, in A01 in FIG. 10, "encryption is not performed" and "transmit only scanned job" are set for the parent device, and the child device does not have a scanning engine and shows a case where it is not determined whether a scanning pattern acquisition date is recent or not. In this case, since virus scanning information is necessarily added to print data received by the child device, only print data in which no virus has been detected is transmitted to the child device, and thus it is determined that all pieces of print data received by the child device are to be printed.

Figure 13:
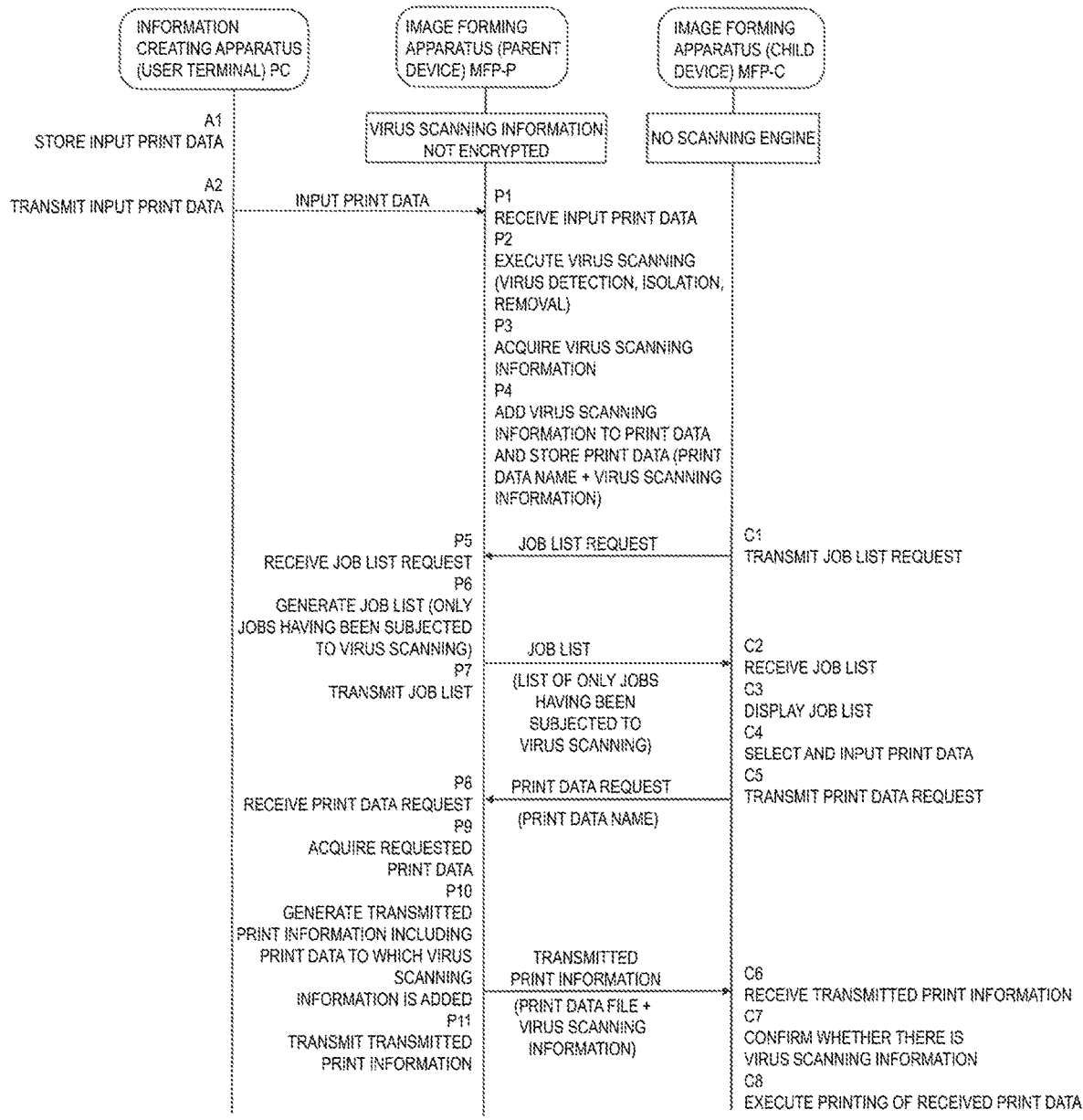
FIG. 13 is a communication sequence of an example of information communication processing from when infection countermeasure processing is performed on print data input to the parent device to when the child device executes printing processing in the image processing system according to the present disclosure.

A communication sequence corresponding to A01 is illustrated in FIG. 13 to be described later.

A02 of FIG. 10

In A02 of FIG. 10, "encryption is not performed" and "transmit including unscanned job" are set for the parent device, and the child device does not have a scanning engine and shows a case where it is not determined whether a scanning pattern acquisition date is recent or not.

In this case, print data received in the child device includes print data to which virus scanning information is added and print data to which virus scanning information is not added, which differ in terms of whether printing is executable.

When virus scanning information is added to the print data received in the child device, the print data is to be printed, similar to A01.

On the other hand, when virus scanning information is not added to the print data received in the child device, it is determined that the print data is not to be printed because there is a possibility that the print data has been infected.

Figure 14:
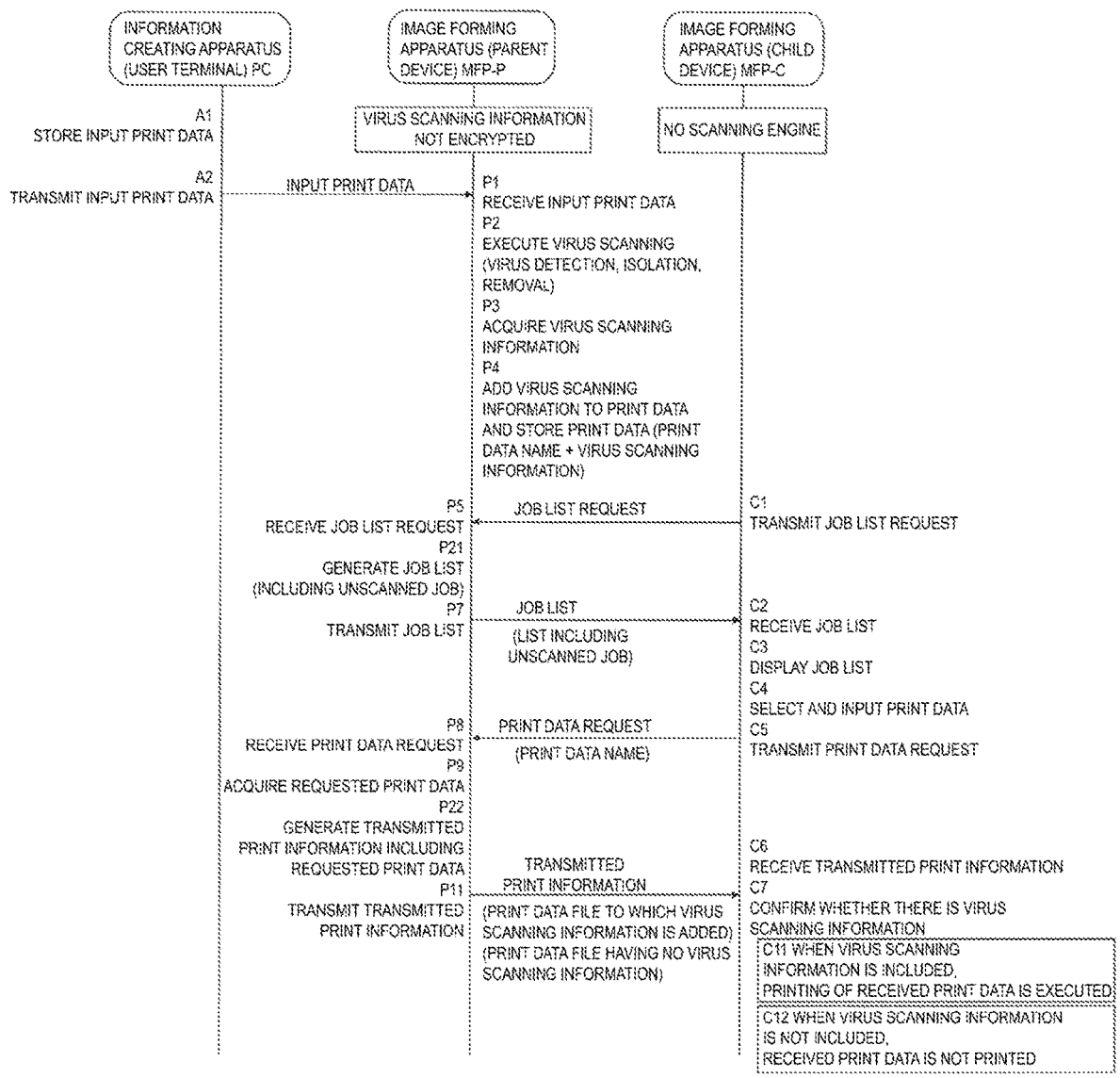
FIG. 14 is a communication sequence of an example of information communication processing from when infection countermeasure processing is performed on print data input to the parent device to when the child device executes printing processing in the image processing system according to the present disclosure.

A communication sequence corresponding to A02 is illustrated in FIG. 14 to be described later.

A03 of FIG. 10

In A03 of FIG. 10, "encryption is not performed" and "transmit including unscanned job" are set for the parent device, and the child device has a scanning engine and shows a case where it is not determined whether a scanning pattern acquisition date is recent or not, but virus scanning processing is performed on an unscanned job in the child device.

Also in this case, the print data received in the child device includes print data to which virus scanning information is added and print data to which virus scanning information is not added, which differ in terms of whether printing is executable.

When virus scanning information is added to the print data received in the child device, the print data is to be printed, similar to A01.

On the other hand, when virus scanning information is not added to the print data received in the child device, virus scanning processing is executed in the child device, it is determined that the print data is to be printed when no virus has been detected, and it is determined that the print data is not to be printed when a virus has been detected.

Figure 15:
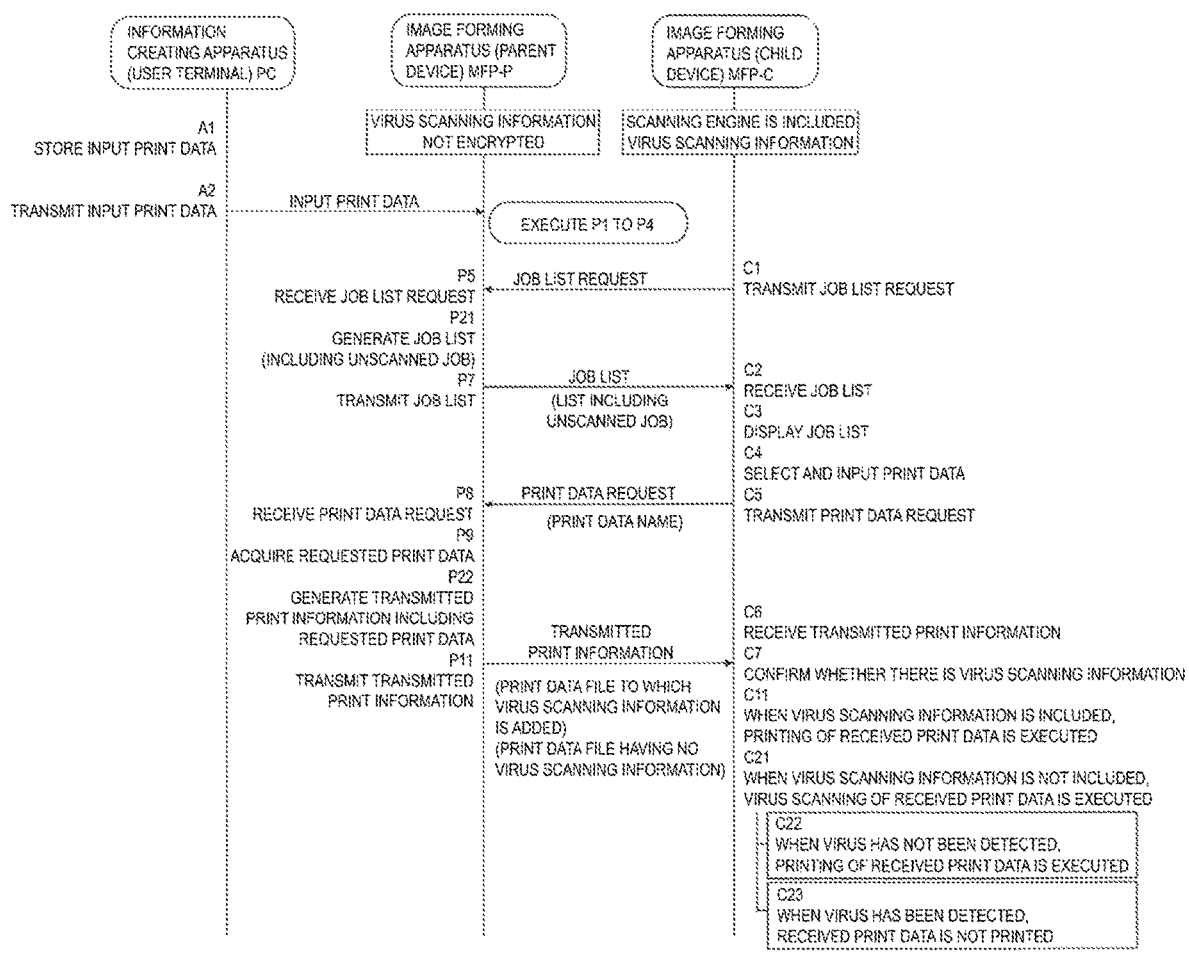
FIG. 15 is a communication sequence of an example of information communication processing from when infection countermeasure processing is performed on print data input to the parent device to when the child device executes printing processing in the image processing system according to the present disclosure.

A communication sequence corresponding to A03 is illustrated in FIG. 15 to be described later.

A04 in FIG. 10

In A04 in FIG. 10, "encryption is not performed" and "transmit only scanned job" are set for the parent device, and the child device has a scanning engine and shows a case where it is determined whether a scanning pattern acquisition date is recent or not, and virus scanning processing is executed in the child device for print data in which a scanning pattern acquisition date of the received virus scanning information is not recent.

In this case, virus scanning information is added to all of pieces of print data received in the child device, and thus scanning pattern acquisition dates thereof are compared and determined to be recent or not.

When the scanning pattern acquisition date of the received virus scanning information is more recent than the scanning pattern acquisition date of the scanning processing information 144 stored in the child device, it is determined that printing is to be performed.

On the other hand, when the scanning pattern acquisition date of the received virus scanning information is less recent than the scanning pattern acquisition date of the scanning processing information 144 stored in the child device, virus scanning processing is executed in the child device.

As a result of the execution of virus scanning processing, when no virus has been detected, it is determined that printing is to be performed, and when a virus has been detected, it is determined that printing is not to be performed.

A05 in FIG. 10

In A05 in FIG. 10, "encryption is not performed" and "transmit including unscanned job" are set for the parent device, and the child device has a scanning engine and shows a case where it is determined whether a scanning pattern acquisition date is recent or not for a scanned job having virus scanning information, virus scanning processing is executed in the child device for print data in which a scanning pattern acquisition date of the received virus scanning information is not recent, and virus scanning processing is executed in the child device for an unscanned job.

In this case, for a scanned job having virus scanning information, it is determined that printing is to be performed when the scanning pattern acquisition date of the received virus scanning information is more recent than the scanning pattern acquisition date of the scanning processing information 144 stored in the child device, similar to A04.

On the other hand, when the scanning pattern acquisition date of the received virus scanning information is less recent than the scanning pattern acquisition date of the scanning processing information 144 stored in the child device, virus scanning processing is executed in the child device, it is determined that printing is to be performed when no virus has been detected, and it is determined that printing is not to be performed when a virus has been detected.

For an unscanned job having no virus scanning information, virus scanning processing is executed in the child device, it is determined that printing is to be performed when no virus has been detected, and it is determined that printing is not to be performed when a virus has been detected.

Figure 16:
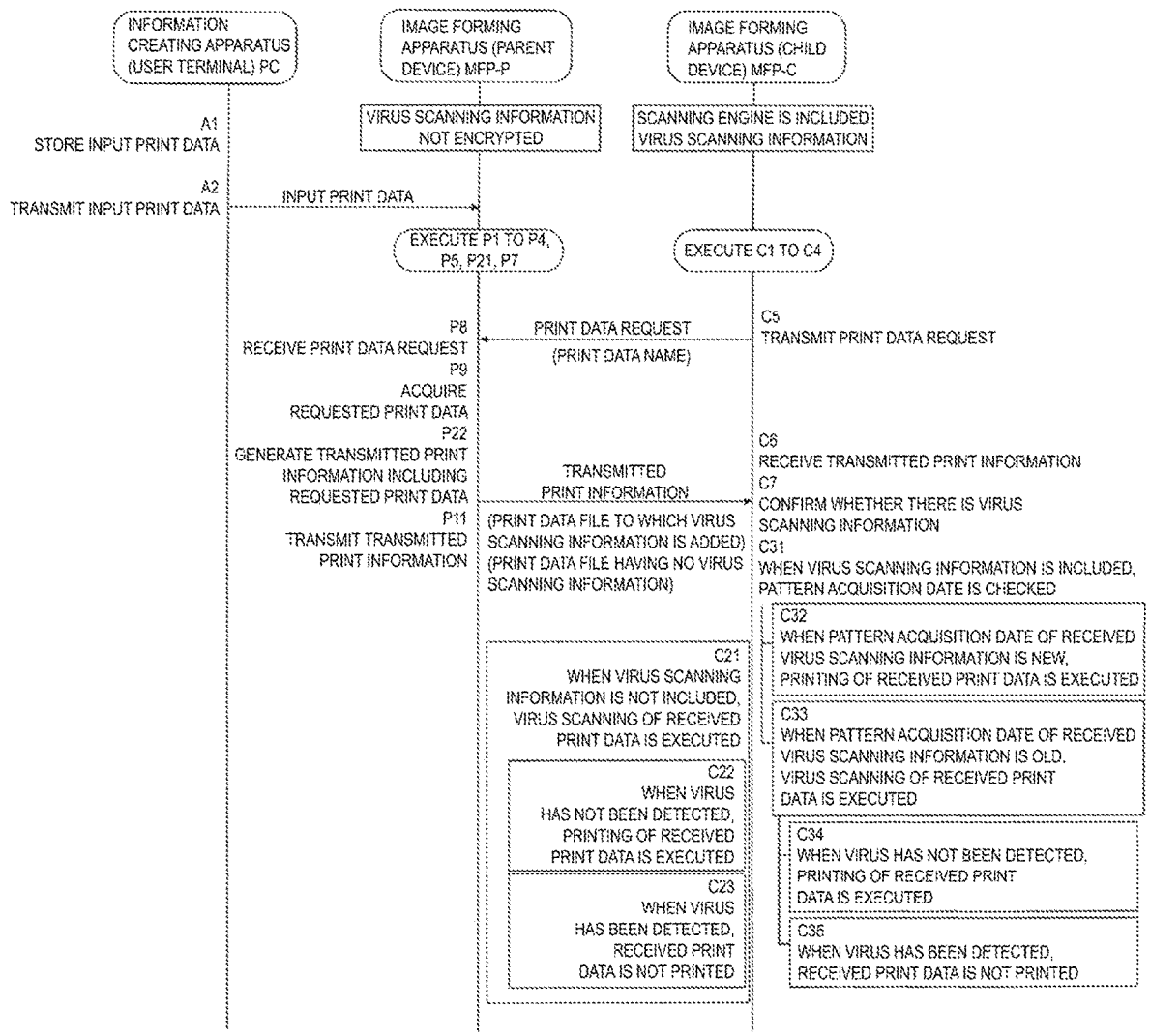
FIG. 16 is a communication sequence of an example of information communication processing from when infection countermeasure processing is performed on print data input to the parent device to when the child device executes printing processing in the image processing system according to the present disclosure.

A communication sequence corresponding to A05 is illustrated in FIG. 16 to be described later.

Example of Correspondence Relationship Between Setting Conditions when Virus Scanning Information is Encrypted and Decrypted with Encryption Key of Parent Device and Whether Printing is Executable in Child Device FIG. 11 is a diagram illustrating an example of a correspondence relationship between setting conditions in a case where virus scanning information is encrypted and decrypted with an encryption key of a parent device and whether printing is executable in a child device.

Here, the following matters are set as setting conditions for determining whether printing is executable.

(1) Whether to include only print data having been subjected to virus scanning processing in a job list or transmitted print information
(2) Whether the child device has an infection countermeasure function (scanning engine)
(3) Whether to determine whether a scanning pattern acquisition date is recent or not
(4) A result of execution of virus scanning processing in the child device (whether a virus has been detected)
(5) In the parent device, virus scanning information is encrypted with an encryption key (private key) of the parent device.
(6) In the child device, the encrypted virus scanning information is decrypted with the encryption key (public key) of the parent device, and it is determined whether the decryption is executable.

The above-described conditions (1) to (4) are the same as those in FIG. 10.

It is assumed that the encryption and decryption of the virus scanning information are performed using a "public key cryptosystem" and using a private key and a public key which are encryption keys of the parent device.

It is also assumed that the private key of the parent device is stored in advance in the parent device, and the public key of the parent device is transferred from the parent device to the child device and stored in advance in the child device.

When the virus scanning information is encrypted with the private key of the parent device in the parent device, the received encrypted virus scanning information is decrypted with the public key of the parent device in the child device.

In FIG. 11, four printing possibility patterns (B01 to B04) are illustrated.

As a setting condition in the parent device (MFP-P), virus scanning information is encrypted with an encryption key (private key) of the parent device stored in the parent device.

It is assumed that a job list transmitted to the child device includes a case where only the name of print data on which virus scanning processing has been performed (scanned job) in the parent device and in which no virus has been detected is included and a case where not only the scanned job but also the name of print data on which virus scanning processing has not been performed (unscanned job) is included.

As the state of the child device (MFP-C), the received encrypted virus scanning information is decrypted with the encryption key (public key) of the parent device to determine whether decryption is executable, and it is assumed that the child device (MFP-C) may or may not include a scanning engine.

Further, when the child device (MFP-C) includes a scanning engine, it is assumed that the child device may or may not execute virus scanning processing, and may or may not determine whether a scanning pattern acquisition date is recent or not.

B01 in FIG. 11

In B01 in FIG. 11, "encryption is performed" and "transmit only scanned job" are set for the parent device, and the child device does not have a scanning engine and shows a case where in the child device, decryption is performed to determine whether decryption is executable, but it is not determined whether a scanning pattern acquisition date is recent or not.

In this case, first, virus scanning information is necessarily added to print data in the parent device, but the virus scanning information is encrypted with the private key of the parent device, and the print data having the encrypted virus scanning information added thereto is transmitted to the child device.

Since the encrypted virus scanning information is necessarily added to the print data received in the child device, the encrypted virus scanning information is decrypted in the child device with the public key of the parent device stored in advance, and it is determined whether decryption is executable.

In the determination of whether decryption is possible, it is determined whether the decrypted virus scanning information is normal virus scanning information. When the decrypted virus scanning information is normal virus scanning information (when decryption is executable), it is determined that printing is to be performed. When the decrypted virus scanning information is invalid virus scanning information (when decryption is not executable), or when decryption cannot be performed, it is determined that printing is not to be performed.

B02 of FIG. 11

In B02 of FIG. 11, "encryption is performed" and "transmit including unscanned job" are set for the parent device, the child device does not have a scanning engine and shows a case where decryption is performed to determine whether decryption is executable for a scanned job having virus scanning information in the child device, but it is not determined whether a scanning pattern acquisition date is recent or not.

In this case, print data received in the child device includes print data to which encrypted virus scanning information is added and print data to which encrypted virus scanning information is not added, which differ in terms of whether printing is executable.

When the print data received in the child device is print data to which encrypted virus scanning information is added, the encrypted virus scanning information is decrypted with the public key of the parent device stored in advance, and it is determined whether decryption is executable.

In the determination of whether decryption is executable, it is determined whether the decrypted virus scanning information is normal virus scanning information. When the decrypted virus scanning information is normal virus scanning information (when decryption is executable), it is determined that printing is to be performed. When the decrypted virus scanning information is invalid virus scanning information (when decryption is not executable), or when decryption cannot be performed, it is determined that printing is not to be performed.

On the other hand, when virus scanning information is not added to the print data received in the child device, it is determined that the print data is not to be printed because there is a possibility that the print data has been infected.

Figure 18:
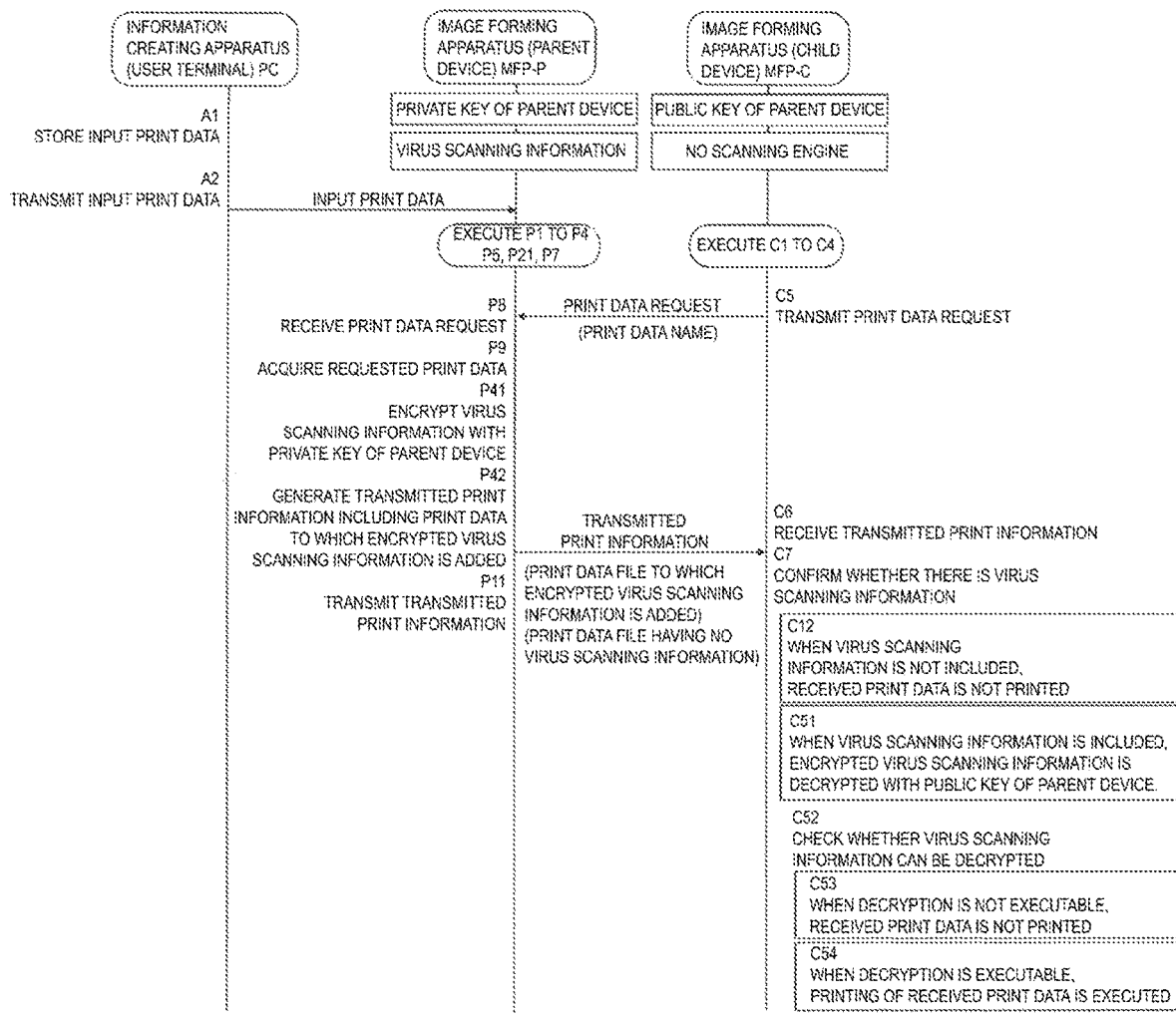
FIG. 18 is a communication sequence of an example of information communication processing from when infection countermeasure processing is performed on print data input to the parent device to when the child device executes printing processing in the image processing system according to the present disclosure.

A communication sequence corresponding to B02 is illustrated in FIG. 18 to be described later.

B03 of FIG. 11

In B03 of FIG. 11, "encryption is performed" and "transmit including unscanned job" are set for the parent device, the child device does not have a scanning engine and shows a case where decryption is performed to determine whether decryption is executable for a scanned job having virus scanning information in the child device, and it is determined whether a scanning pattern acquisition date is recent or not.

Also in this case, similar to B02, print data received in the child device includes print data to which encrypted virus scanning information is added and print data to which encrypted virus scanning information is not added, which differ in terms of whether printing is executable.

Similarly to B02, when the print data received in the child device is print data to which encrypted virus scanning information is added, the encrypted virus scanning information is decrypted with the public key of the parent device stored in advance, and it is determined whether decryption is executable.

In the determination of whether decryption is executable, it is determined whether the decrypted virus scanning information is normal virus scanning information. When the decrypted virus scanning information is invalid virus scanning information (when decryption is not executable), or when decryption cannot be performed, it is determined that printing is not to be performed.

On the other hand, in the determination of whether decryption is executable, when it is determined that the decrypted virus scanning information is normal virus scanning information (when decryption is executable), scanning pattern acquisition dates of the decrypted virus scanning information are compared and determined to be recent or not. When the scanning pattern acquisition date of the decrypted virus scanning information is more recent than the current date and time within a predetermined period (Δ1 in B03 of FIG. 11), it is determined that printing is to be performed.

However, when the scanning pattern acquisition date of the decrypted virus scanning information is less recent than the current date and time by a predetermined period or more (Δ2 in B03 of FIG. 11), it is determined that printing is not to be performed.

When no virus scanning information is added to the print data received in the child device, it is determined that the print data is not to be printed because there is a possibility that the print data has been infected, similar to B02.

Figure 19:
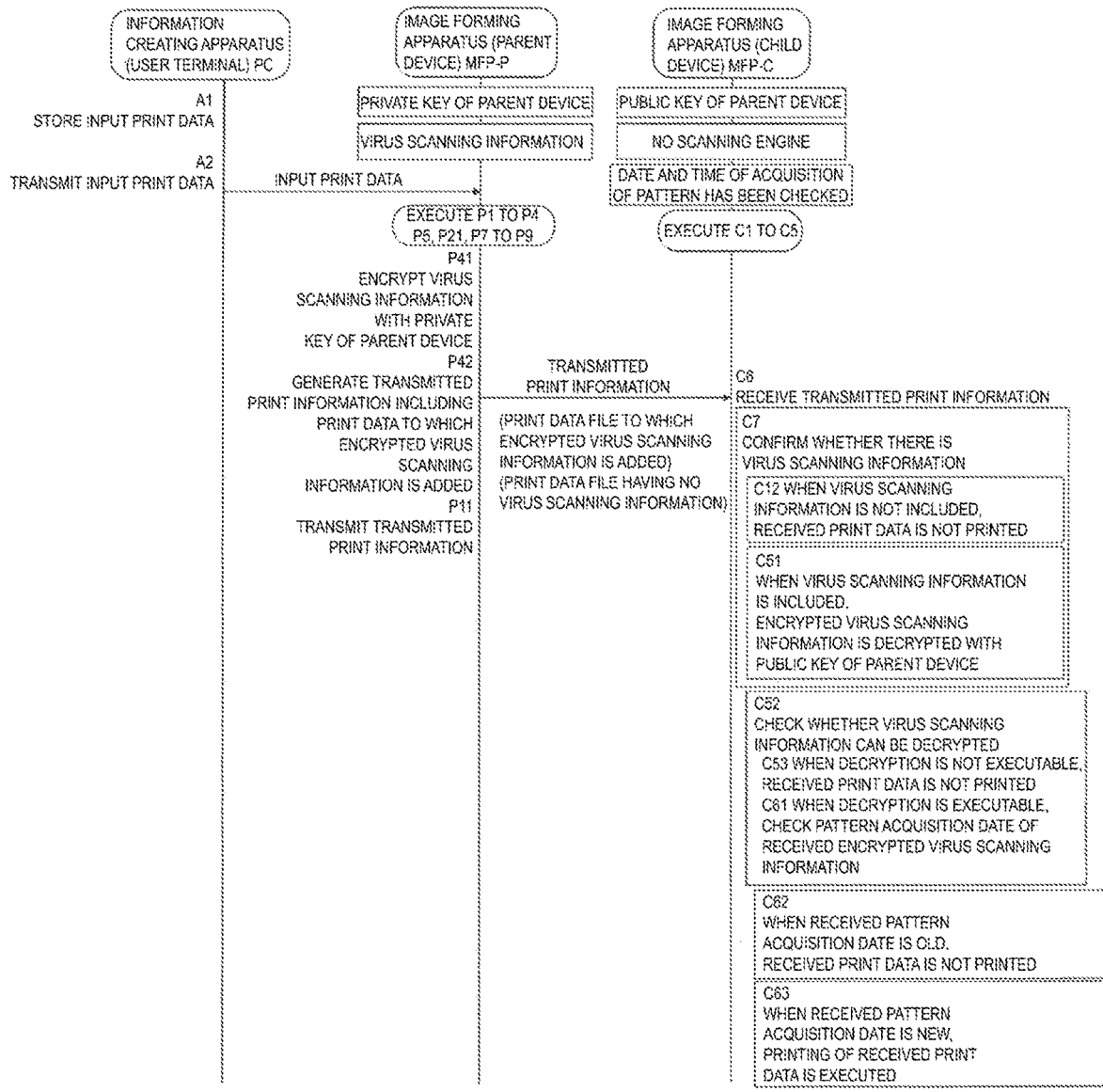
FIG. 19 is a communication sequence of an example of information communication processing from when infection countermeasure processing is performed on print data input to the parent device to when the child device executes printing processing in the image processing system according to the present disclosure.

A communication sequence corresponding to B03 is illustrated in FIG. 19 to be described later.

B04 in FIG. 11

In B04 in FIG. 11, "encryption is performed" and "transmit including unscanned job" are set for the parent device, the child device has a scanning engine and shows a case where decryption is performed to determine whether decryption is executable for a scanned job having virus scanning information in the child device, and it is determined whether a scanning pattern acquisition date is recent or not. Further, virus scanning processing is executed in the child device for print data in which a scanning pattern acquisition date of the received virus scanning information is not recent, and virus scanning processing is also executed in the child device for an unscanned job.

In this case, similarly to the B03, when the print data received in the child device is print data to which encrypted virus scanning information is added, the encrypted virus scanning information is decrypted with the public key of the parent device stored in advance, and it is determined whether decryption is executable.

In the determination of whether decryption is executable, when it is determined that the decrypted virus scanning information is normal virus scanning information (when decryption is executable), scanning pattern acquisition dates of the decrypted virus scanning information are compared and determined to be recent or not.

When the scanning pattern acquisition date of the decrypted virus scanning information is more recent than the scanning pattern acquisition date of the scanning processing information 144 stored in the child device, it is determined that printing is to be performed.

On the other hand, when the scanning pattern acquisition date of the decrypted virus scanning information is less recent than the scanning pattern acquisition date of the scanning processing information 144 stored in the child device, virus scanning processing is executed in the child device. When no virus has been detected, it is determined that printing is to be performed, and when a virus has been detected, it is determined that printing is not to be performed.

In the determination of whether decryption is executable, when the decrypted virus scanning information is invalid virus scanning information (when decryption is not executable) or when decryption cannot be performed, virus scanning processing is executed in the child device. When no virus has been detected, it is determined that printing is to be performed, and when a virus has been detected, it is determined that printing is not to be performed.

Further, also when virus scanning information is not added to the print data received in the child device, virus scanning processing is executed in the child device. When no virus has been detected, it is determined that printing is to be performed, and when a virus has been detected, it is determined that printing is not to be performed.

Figure 20:
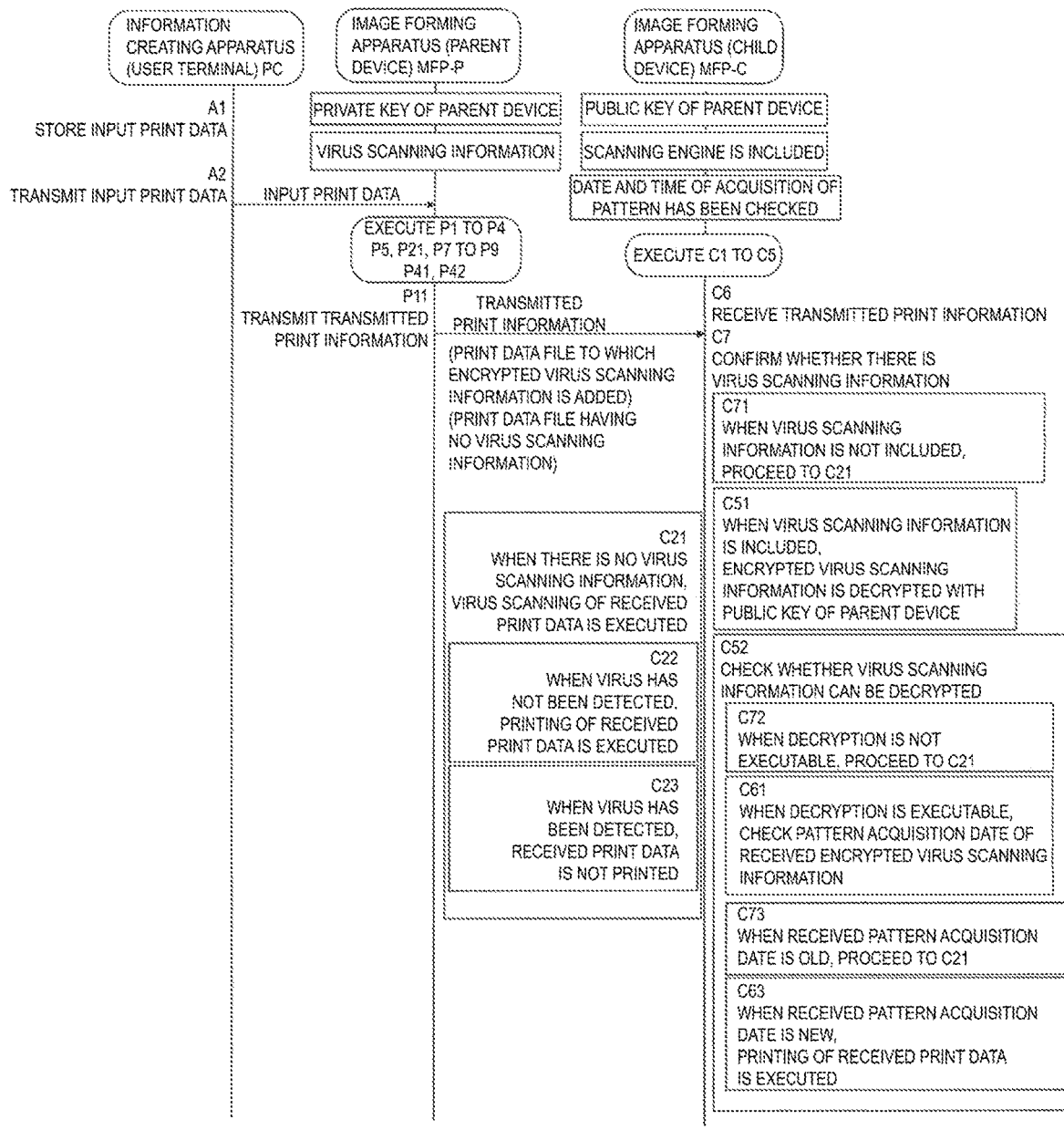
FIG. 20 is a communication sequence of an example of information communication processing from when infection countermeasure processing is performed on print data input to the parent device to when the child device executes printing processing in the image processing system according to the present disclosure.

A communication sequence corresponding to B04 is illustrated in FIG. 20 to be described later.

Example of Correspondence Relationship Between Setting Conditions when Virus Scanning Information is Encrypted and Decrypted with Encryption Key of Child Device and Whether Printing is Executable in Child Device FIG. 12 is a diagram illustrating an example of a correspondence relationship between setting conditions when virus scanning information is encrypted and decrypted with an encryption key of a child device and whether printing is executable in the child device.

Here, the following matters are set as setting conditions for determining whether printing is executable.
 (1) Whether to include only print data having been subjected to virus scanning processing in a job list or transmitted print information
 (2) Whether the child device has an infection countermeasure function (scanning engine)
 (3) Whether to determine whether a scanning pattern acquisition date is recent or not
 (4) A result of execution of virus scanning processing in the child device (whether a virus has been detected)
 (5) In the parent device, virus scanning information is encrypted with an encryption key (public key) of the child device.
 (6) In the child device, the encrypted virus scanning information is decrypted with the encryption key (private key) of the child device, and it is determined whether the decryption is executable.

The above-described conditions (1) to (4) are the same as those in FIG. 10.

The encryption and decryption of the virus scanning information are performed using a "public key cryptosystem", but this example is different from the above-described example in FIG. 11 in that the private key and the public key, which are the encryption keys of the child device, are used.

It is also assumed that the private key of the child device is stored in advance in the child device, and the public key of the child device is transferred from the child device to the parent device and stored in advance in the parent device.

When the virus scanning information is encrypted with the public key of the child device in the parent device, the received encrypted virus scanning information is decrypted with the private key of the child device in the child device.

In FIG. 12, four printing possibility patterns (C01 to C04) are illustrated, but this example is different from the example in FIG. 11 only in that the encryption key of the child device is used as the encryption key, and is the same as the example in FIG. 11 in terms of the state of the child device and whether printing is executable in the child device.

C01 in FIG. 12

In C01 in FIG. 12, similarly to B01 in FIG. 11, "encryption is performed" and "transmit only scanned job" are set for the parent device, and the child device does not have a scanning engine and shows a case where decryption is performed to determine whether decryption is executable, but it is not determined whether a scanning pattern acquisition date is recent or not in the child device.

In this case, first, virus scanning information is necessarily added to print data in the parent device, but the virus scanning information is encrypted with the public key of the child device, and the print data having the encrypted virus scanning information added thereto is transmitted to the child device.

Since the encrypted virus scanning information is necessarily added to the print data received in the child device, the encrypted virus scanning information is decrypted with the private key of the child device stored in advance, and it is determined whether decryption is executable.

In the determination of whether decryption is executable, it is determined whether the decrypted virus scanning information is normal virus scanning information. When the decrypted virus scanning information is normal virus scanning information (when decryption is executable), it is determined that printing is to be performed. When the decrypted virus scanning information is invalid virus scanning information (when decryption is not executable), or when decryption cannot be performed, it is determined that printing is not to be performed.

Figure 17:
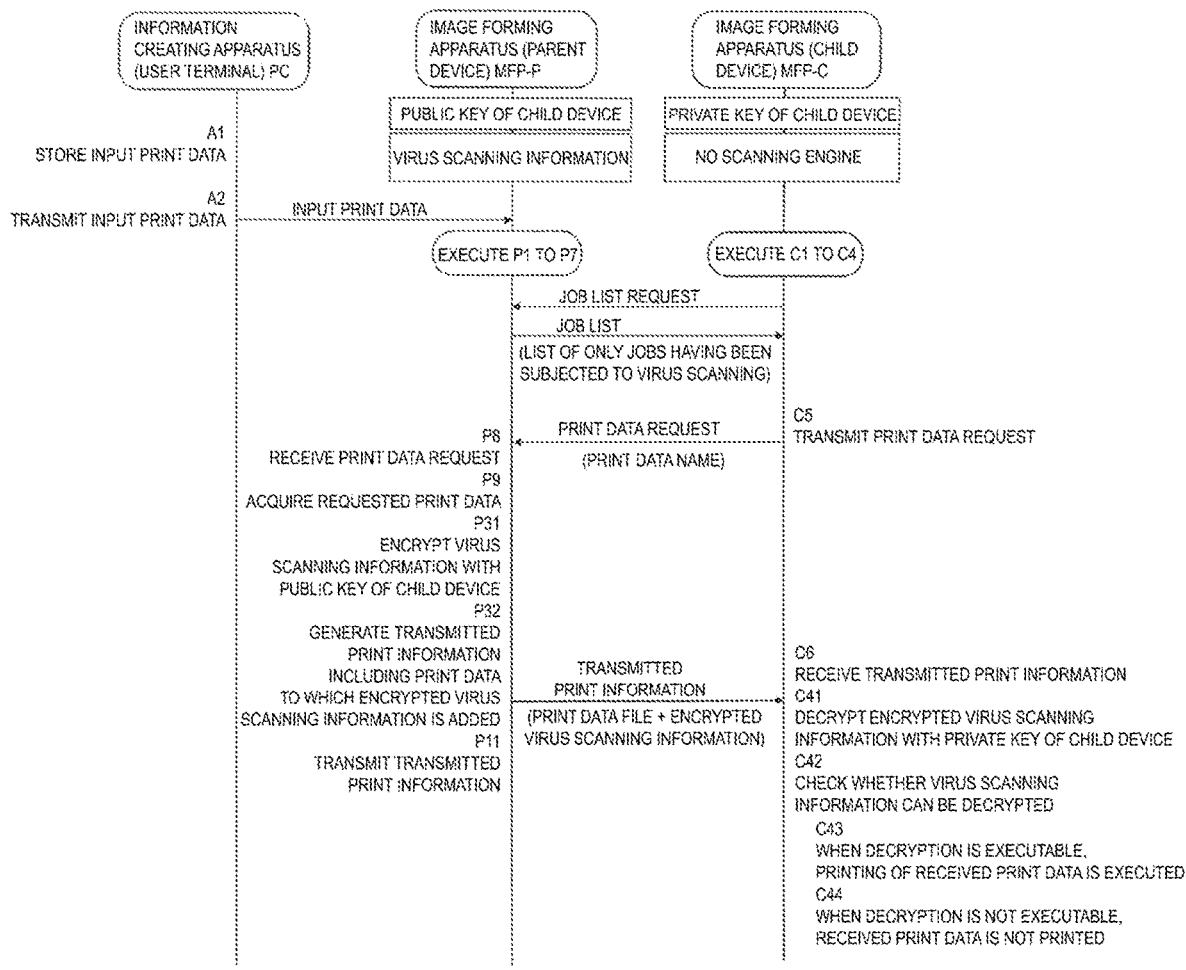
FIG. 17 is a communication sequence of an example of information communication processing from when infection countermeasure processing is performed on print data input to the parent device to when the child device executes printing processing in the image processing system according to the present disclosure.

A communication sequence corresponding to C01 is illustrated in FIG. 17 to be described later.

C02 of FIG. 12

In C02 of FIG. 12, similarly to B02 of FIG. 11, "encryption is performed" and "transmit including unscanned job" are set for the parent device, the child device does not have a scanning engine and shows a case where decryption is performed to determine whether decryption is executable for a scanned job having virus scanning information in the child device, but it is not determined whether a scanning pattern acquisition date is recent or not.

In this case, print data received in the child device includes print data to which encrypted virus scanning information is added and print data to which encrypted virus scanning information is not added, which differ in terms of whether printing is executable.

When the print data received in the child device is print data to which encrypted virus scanning information is added, the encrypted virus scanning information is decrypted with the private key of the child device stored in advance, and it is determined whether decryption is executable.

In the determination of whether decryption is executable, it is determined whether the decrypted virus scanning information is normal virus scanning information. When the decrypted virus scanning information is normal virus scanning information (when decryption is executable), it is determined that printing is to be performed. When the decrypted virus scanning information is invalid virus scanning information (when decryption is not executable), or when decryption cannot be performed, it is determined that printing is not to be performed.

On the other hand, when virus scanning information is not added to the print data received in the child device, it is determined that the print data is not to be printed because there is a possibility that the print data has been infected.

C03 of FIG. 12

In C03 of FIG. 12, similarly to B03 of FIG. 11, "encryption is performed" and "transmit including unscanned job" are set for the parent device, the child device does not have a scanning engine and shows a case where decryption is performed to determine whether decryption is executable for a scanned job having virus scanning information in the child device, and it is determined whether a scanning pattern acquisition date is recent or not.

Also in this case, similar to C02, print data received in the child device includes print data to which encrypted virus scanning information is added and print data to which encrypted virus scanning information is not added, which differ in terms of whether printing is executable.

Similarly to C02, when the print data received in the child device is print data to which encrypted virus scanning information is added, the encrypted virus scanning information is decrypted with the private key of the child device stored in advance, and it is determined whether decryption is executable.

In the determination of whether decryption is executable, it is determined whether the decrypted virus scanning information is normal virus scanning information. When the decrypted virus scanning information is invalid virus scanning information (when decryption is not executable), or when decryption cannot be performed, it is determined that printing is not to be performed.

On the other hand, in the determination of whether decryption is executable, when it is determined that the decrypted virus scanning information is normal virus scanning information (when decryption is executable), scanning pattern acquisition dates of the decrypted virus scanning information are compared and determined to be recent or not. When the scanning pattern acquisition date of the decrypted virus scanning information is more recent than the current date and time within a predetermined period (Δ1 in C03 in FIG. 12), it is determined that printing is to be performed.

However, when the scanning pattern acquisition date of the decrypted virus scanning information is less recent than the current date and time by a predetermined period or more (Δ2 in C03 in FIG. 12), it is determined that printing is not to be performed.

When no virus scanning information is added to the print data received in the child device, it is determined that the print data is not to be printed because there is a possibility that the print data has been infected, similar to C02.

C04 in FIG. 12

In C04 in FIG. 12, similarly to B04 in FIG. 11, "encryption is performed" and "transmit including unscanned job" are set for the parent device, the child device has a scanning engine and shows a case where decryption is performed to determine whether decryption is executable for a scanned job having virus scanning information in the child device, and it is determined whether a scanning pattern acquisition date is recent or not. Further, virus scanning processing is executed in the child device for print data in which a scanning pattern acquisition date of the received virus scanning information is old, and virus scanning processing is also executed in the child device for an unscanned job.

In this case, similarly to C03, when the print data received in the child device is print data to which encrypted virus scanning information is added, the encrypted virus scanning information is decrypted with the private key of the child device stored in advance, and it is determined whether decryption is executable.

In the determination of whether decryption is executable, when it is determined that the decrypted virus scanning information is normal virus scanning information (when decryption is executable), scanning pattern acquisition dates of the decrypted virus scanning information are compared and determined to be recent or not.

When the scanning pattern acquisition date of the decrypted virus scanning information is more recent than the scanning pattern acquisition date of the scanning processing information 144 stored in the child device, it is determined that printing is to be performed.

On the other hand, when the scanning pattern acquisition date of the decrypted virus scanning information is less recent than the scanning pattern acquisition date of the scanning processing information 144 stored in the child device, virus scanning processing is executed in the child device. When no virus has been detected, it is determined that printing is to be performed, and when a virus has been detected, it is determined that printing is not to be performed.

In the determination of whether decryption is executable, when the decrypted virus scanning information is invalid virus scanning information (when decryption is not executable) or when decryption cannot be performed, virus scanning processing is executed in the child device. When no virus has been detected, it is determined that printing is to be performed, and when a virus has been detected, it is determined that printing is not to be performed.

Further, also when virus scanning information is not added to the print data received in the child device, virus scanning processing is executed in the child device. When no virus has been detected, it is determined that printing is to be performed, and when a virus has been detected, it is determined that printing is not to be performed.

Example of Information Communication Processing from when Infection Countermeasure Processing is Performed on Print Data Input to Parent Device to when Printing Processing is Executed in Child Device Hereinafter, description will be given of a communication sequence of an example of information communication processing corresponding to the correspondence relationships between setting conditions and whether printing is executable in the child device illustrated in FIGS. 10 to 12, the information communication processing being performed from when infection countermeasure processing is performed on print data input to the parent device to when printing processing is executed in the child device.

Communication sequences in FIGS. 13 to 16 are examples of when encryption and decryption of virus scanning information are not performed. The communication sequence in FIG. 13 corresponds to A01 in FIG. 10, the communication sequence in FIG. 14 corresponds to A02 in FIG. 10, the communication sequence in FIG. 15 corresponds to A03 in FIG. 10, and the communication sequence in FIG. 16 corresponds to A05 in FIG. 10.

Communication sequences in FIGS. 17 to 20 are examples of when encryption and decryption of virus scanning information are performed. The communication sequence in FIG. 17 corresponds to C01 in FIG. 12, the communication sequence in FIG. 18 corresponds to B02 in FIG. 11, the communication sequence in FIG. 19 corresponds to B03 in FIG. 11, and the communication sequence in FIG. 20 corresponds to B04 in FIG. 11.

Example 1 of Information Communication Processing: No Encryption, A01 in FIG. 10

FIG. 13 illustrates a communication sequence of an example of information communication processing from when infection countermeasure processing is performed on print data input to the parent device to when the child device executes printing processing only on print data having been subjected to virus scanning processing.

Here, a communication sequence performed between an information creating apparatus (user terminal) PC, an image forming apparatus (parent device) MFP-P, and an image forming apparatus (child device) MFP-C is shown.

It is assumed that virus scanning processing is executed on input print data in the parent device, a virus scanning engine and virus pattern information are stored in the parent device, and the virus scanning information as illustrated in FIG. 6 is stored.

Further, it is assumed that a job list including a print data name of only print data having been subjected to virus scanning processing (scanned job) is transmitted to the child device, and only a file of print data having been subjected to virus scanning processing (scanned job) is transmitted to the child device.

The job list and the file of the print data transmitted to the child device necessarily include virus scanning information (scanned job).

It is assumed that the child device does not have a virus scanning engine and cannot execute virus scanning processing, and only print data including virus scanning information (scanned job) is printed.

Thus, since a print data name of print data having not been subjected to virus scanning processing (unscanned job) is not included in the job list, the child device cannot select the unscanned job as a printing target, and a file of the unscanned job is not transmitted to the child device.

In step A1 of the information creating apparatus (user terminal) PC in FIG. 13, it is assumed that a user creates input print data for the purpose of printing, gives a print data name, and stores the input print data.

The number of pieces of input print data may be one or two or more.

In step A2, when the user selects the image forming apparatus (parent device) MFP-P as a transmission destination of the input print data and performs an input operation to transmit the input print data, a file of the input print data having the print data name assigned thereto is transmitted to the parent device MFP-P.

In step P1 of the image forming apparatus (parent device) MFP-P, the input print data 44 is received.

In step P2, virus scanning processing is executed on the received input print data 44.

In the virus scanning processing, for example, processing such as virus detection, virus isolation, and virus removal is performed.

Here, it is assumed that the following processing is not performed on print data in which a virus has been detected or isolated print data, and the print data is not included in the job list.

In step P3, virus scanning information 45, which is information related to a virus scanning engine and a virus pattern used when the virus scanning processing is executed, is acquired from the storage 40.

In step P4, the virus scanning information 45 is added to the input print data 44 and stored in the storage 40.

The input print data 44 having the virus scanning information 45 added thereto and stored is print data in which no virus has been detected.

Here, a print data name of the input print data 44, the virus scanning information 45, and a file that is the entity of the input print data 44 are stored in association with each other.

It is assumed that the user who has created input print data by the information creating apparatus PC goes to a place where the image forming apparatus (child device) MFP-C is installed and performs an input of information (user name) for identifying the user and an input operation for requesting a job list in the child device MFP-C in order to print the input print data created by the user.

At this time, for example, in order to perform user authentication processing, a user ID and a password may be input, and when the user authentication has been successful, a user name may be acquired.

In step C1 of the image forming apparatus (child device) MFP-C, the job list request 145 including the user name is generated and transmitted to the parent device MFP-P.

For example, the job list request 145 as illustrated in FIG. 7 is transmitted.

In step P5 of the parent device MFP-P, the job list request 48 is received.

In step P6, the job list 46 is generated.

Here, the print data name of the input print data 44 stored in the storage 40 in association with the user name included in the received job list request is acquired.

In this example, since the job list including only the print data having been subjected to the virus scanning processing (scanned job) is transmitted, the print data name of the input print data 44 associated with the user name and having the virus scanning information 45 added thereto is acquired.

For example, in the job list 46 as illustrated in FIG. 6, the job list 46 including only the print data name of the input print data 44 having the virus scanning information 45 added the thereto is generated.

In step P7, the generated job list 46 is transmitted to the child device MFP-C.

Here, the job list 46 including only a scanned job is transmitted.

In step C2 of the child device MFP-C, the job list is received (received job list 146).

In step C3, the received job list 146 is displayed on the display 103.

For example, the print job list display screen G1 as illustrated in FIG. 8 is displayed.

However, in this example, since all pieces of print data of the received job list 146 to be displayed are scanned jobs, "○ (scanned)" is displayed in all of the fields of "unscanned/scanned".

In this example, since an unscanned job is not included in the received job list 146, it may be displayed that print data having not yet been subjected to virus scanning processing in the parent device is not included in the job list in order to draw attention.

The user views the display screen G1 and performs an input operation to select desired print data to be printed.

For example, when an input operation for selecting the field of "printing selected/not selected" corresponding to a desired print data name displayed on the display screen G1 in FIG. 8 is performed, a mark "○" indicating that selection has been made is displayed in the field of "printing selected/not selected".

When an input operation for selecting a desired print data name is performed, the scanning information details display screen G2 as illustrated in FIG. 9 may be displayed.

In step C4, when the user performs an input operation for selecting print data, a print data request is generated to request the parent device to transmit the selected print data.

For example, the print data request 148 as illustrated in FIG. 7 is generated.

In step C5, when the user performs a predetermined input operation for requesting the parent device to transmit the print data, the generated print data request 148 is transmitted to the parent device MFP-P.

In step P8 of the parent device MFP-P, the print data request 49 is received.

In step P9, print data having a print data name included in the print data request is acquired from the storage 40 of the parent device.

In step P10, transmitted print information including a file of the acquired print data having virus scanning information added thereto is generated.

For example, the transmitted print information 47 as illustrated in FIG. 6 is generated.

In step P11, the generated transmitted print information 47 is transmitted to the child device MFP-C.

In step C6 of the child device MFP-C, the transmitted print information 47 is received (received print information 147).

In step C7, it is confirmed whether virus scanning information is included in the received print information 147.

In step C8, the received print data is printed on a predetermined print sheet.

In this example, since all of the pieces of print data received include virus scanning information, all of the pieces of print data are printed.

As described above, since the print data transmitted to the child device is only print data in which virus scanning processing has been executed in the parent device and no virus has been detected, when the latest virus scanning engine and pattern file are used for the virus scanning processing of the parent device, print data infected with a virus is less likely to be transmitted to the child device, and it is possible to alleviate a concern that the child device may be infected with a computer virus.

Example 2 of Information Communication Processing: No Encryption, A02 in FIG. 10

FIG. 14 illustrates a communication sequence of an example of information communication processing in which, after infection countermeasure processing is performed on print data input to a parent device, it is determined whether printing processing can be executed in a child device in accordance with the presence or absence of virus scanning information to be added to the print data, and printing processing is executed in the child device for the print data including the virus scanning information.

FIG. 14 also illustrates a communication sequence performed between the information creating apparatus (user terminal) PC, the image forming apparatus (parent device) MFP-P, and the image forming apparatus (child device) MFP-C.

In the step numbers of FIG. 14, the same step numbers are given to steps of performing the same processing as the steps in FIG. 13.

It is assumed that virus scanning processing is executed on the input print data in the parent device, a virus scanning engine and virus pattern information are stored in the parent device, and the virus scanning information as illustrated in FIG. 6 is stored.

However, immediately after the print data input to the parent device is input, or when a state in which the processing load of the parent device is high continues during job execution or the like, the virus scanning processing may not be executed yet.

It is assumed that virus scanning information is added to print data on which virus scanning processing has been executed in the parent device and in which no virus has been detected, but virus scanning information is not added to print data on which virus scanning processing has been executed and in which a virus has been detected, and virus scanning information is not added to print data in which virus scanning processing has not been executed.

A job list to be transmitted to the child device includes a print data name of print data on which virus scanning processing has been executed (scanned job) and a print data name of print data on which virus scanning processing has not been executed (unscanned job). Transmitted print information transmitted to the child device includes files of a scanned job and an unscanned job, the scanned job is print data which includes virus scanning information and in which no virus has been detected, and the unscanned job is print data which does not include virus scanning information and for which it is unclear whether the print data is infected.

It is assumed that the child device does not have a virus scanning engine and cannot execute virus scanning processing, and only print data including virus scanning information (scanned job) is printed.

In FIG. 14, in steps A1 and A2 of the information creating apparatus (user terminal) PC, steps P1 to P5 of the image forming apparatus (parent device) MFP-P, and step C1 of the image forming apparatus (child device) MFP-C, the same processing as in FIG. 13 is performed.

In steps A1 and A2 in FIG. 14, when a user creates input print data, a file of the input print data given a print data name is transmitted to the parent device MFP-P.

In steps P1 to P4 of the image forming apparatus (parent device) MFP-P, when the input print data 44 is received, virus scanning processing is executed, the virus scanning information 45 is acquired from the storage 40, the virus scanning information 45 is added to the input print data in which no virus has been detected, and a print data name of the input print data 44, the virus scanning information 45, and a file which is the entity of the input print data 44 are stored in association with each other.

On the other hand, it is assumed that virus scanning information is not added to print data on which virus scanning processing has not yet been executed.

In the child device MFP-C, when the user inputs a user name and performs an input operation for requesting a job list, the job list request 145 including the user name is generated in step C1 and transmitted to the parent device MFP-P.

In step P5 of the parent device MFP-P, the job list request 48 is received.

After step P5, in step P21, the print data name of the input print data 44 stored in the storage 40 in association with the user name included in the received job list request is acquired to generate the job list 46.

Here, the print data names of all of the pieces of input print data 44 associated with the user name are acquired.

That is, the job list 46 includes not only print data on which virus scanning processing has been executed (scanned job) but also print data on which virus scanning processing has not yet been executed (unscanned job).

Also in the job list 46, virus scanning information is added to a scanned job, but virus scanning information is not added to an unscanned job.

In step P7, the job list 46 including the unscanned job is transmitted to the child device MFP-C.

In step C2 of the child device MFP-C, the job list is received (received job list 146), and thereafter, similarly to FIG. 13, steps C3 to C5 are executed, and steps P8 and P9 of the parent device MFP-P are executed.

That is, when the print job list display screen G1 including the received job list 146 is displayed on the display 103, and the user views the display screen G1 and performs an input operation for selecting desired print data to be printed, a mark "○" indicating that selection has been made is displayed in the field of "printing selected/not selected", the print data request 148 is generated, and when the user performs a predetermined input operation for requesting the parent device to transmit print data, the generated print data request 148 is transmitted to the parent device MFP-P.

In the case of this example, the job list of the print job list display screen G1 includes scanned jobs and unscanned jobs, but it is possible to easily distinguish whether print data displayed in the job list has been subjected to virus scanning processing by confirming the field of "unscanned/scanned" of the display screen G1.

Thus, the user can select only data having been subjected to virus scanning processing as data to be printed by confirming the field of "unscanned/scanned", or can also confirm an unscanned job by the user's own intention and then select the unscanned job as data to be printed.

When the print data request 49 is received in step P8 of the parent device MFP-P, print data having a print data name included in the print data request is acquired from the storage 40 of the parent device in step P9.

After step P9, in step P22, the transmitted print information 47 including the file of the requested print data is generated.

Here, the transmitted print information 47 includes not only print data having virus scanning information added thereto but also print data having no virus scanning information added thereto when the requested print data is an unscanned job.

In step P11, the generated transmitted print information 47 is transmitted to the child device MFP-C.

Here, in the transmitted print information 47, print data having virus scanning information added thereto and print data having no virus scanning information added thereto are mixed.

Thereafter, similarly to FIG. 13, the child device MFP-C receives the transmitted print information 47 (received print information 147) in step C6, and confirms whether virus scanning information is included in each piece of print data in the received print information 147 in step C7.

In step C11, when print data includes virus scanning information, the received print data is printed on a predetermined print sheet.

On the other hand, when print data does not include virus scanning information in step C12, the received print data is not printed in principle.

However, as described above, when the user confirms that a job is an unscanned job in the job list and then selects the unscanned job as data to be printed, printing may be performed even when the print data does not include virus scanning information.

Example 3 of Information Communication Processing: No Encryption, A03 in FIG. 10

FIG. 15 illustrates a communication sequence of an example of information communication processing in which, after infection countermeasure processing is performed on print data input to a parent device, it is determined whether printing processing can be executed in a child device in accordance with the presence or absence of virus scanning information added to the print data, and virus scanning processing is executed in the child device for the print data having no virus scanning information.

FIG. 15 also illustrates a communication sequence performed between the information creating apparatus (user terminal) PC, the image forming apparatus (parent device) MFP-P, and the image forming apparatus (child device) MFP-C.

In the same step numbers of FIG. 15, the same step numbers are given to steps of performing the same processing as the steps in FIGS. 13 and 14.

In this example, similar to the example of FIG. 14, it is assumed that virus scanning processing is executed on the input print data in the parent device, a virus scanning engine and virus pattern information are stored in the parent device, and the virus scanning information as illustrated in FIG. 6 is stored.

Further, it is assumed that virus scanning information is added to print data on which virus scanning processing has been executed in the parent device and in which no virus has been detected, but virus scanning information is not added to print data on which virus scanning processing has not been executed.

A job list to be transmitted to the child device includes a print data name of print data on which virus scanning processing has been executed (scanned job) and a print data name of print data on which virus scanning processing has not been executed (unscanned job). Transmitted print information transmitted to the child device includes files of a scanned job and an unscanned job, the scanned job is print data which includes virus scanning information and in which no virus has been detected, and the unscanned job is print data which does not include virus scanning information and for which it is unclear whether the print data is infected.

Further, unlike the examples of FIGS. 13 and 14, it is assumed that the child device has a virus scanning engine and executes virus scanning processing on print data which does not include received virus scanning information (unscanned job).

Steps A1 and A2 of the information creating apparatus (user terminal) PC, processing up to steps P1 to P11 of the image forming apparatus (parent device) MFP-P, and processing up to steps C1 to C6 of the image forming apparatus (child device) MFP-C in FIG. 15 are the same processing as in FIG. 14, and thus description thereof will be omitted.

Similarly to FIGS. 13 and 14, after the transmitted print information 47 is received (received print information 147) in step C6 of the child device MFP-C, it is confirmed in step C7 whether virus scanning information is included in each piece of print data in the received print information 147.

In step C11, when virus scanning information is included in print data, the received print data is printed on a predetermined print sheet, similar to FIG. 14.

On the other hand, in step C21, when virus scanning information is not included in print data, virus scanning processing is executed on the received print data.

Here, the virus scanning processing is performed using a virus scanning engine and a virus pattern file stored in the child device.

In step C22, when no virus has been detected in the virus scanning processing, the received print data is printed on a predetermined print sheet.

On the other hand, in step C23, when a virus has been detected in the virus scanning processing, the received print data is not printed.

Example 4 of Information Communication Processing: No Encryption, A05 in FIG. 10

FIG. 16 illustrates a communication sequence of an example of information communication processing in which, after infection countermeasure processing is performed on print data input to a parent device, it is determined whether printing processing can be executed in a child device in accordance with the presence or absence of virus scanning information to be added to the print data and more recent and less recent pattern acquisition dates included in virus scanning information to be added to a print job, and virus scanning processing is executed in the child device for the print data not having a recent pattern acquisition date.

FIG. 16 also illustrates a communication sequence performed between the information creating apparatus (user terminal) PC, the image forming apparatus (parent device) MFP-P, and the image forming apparatus (child device) MFP-C.

In FIG. 16, the same step numbers are given to steps of performing the same processing as the steps in FIGS. 13, 14, and 15.

In the example of FIG. 16, unlike the examples of FIGS. 13 to 15, it is assumed that the child device checks whether a pattern acquisition date of received virus scanning information is recent or not when print data including virus scanning information (scanned job) is received. That is, when virus scanning information is included in the received print information, the scanning pattern acquisition date of the received virus scanning information and the scanning pattern acquisition date of the scanning processing information 144 stored in the storage 140 of the child device are compared with each other to confirm which date is more recent.

It is assumed that the child device has a virus scanning engine, executes virus scanning processing on print data which does not include the received virus scanning information (unscanned job), and also executes virus scanning processing when the scanning pattern acquisition date of the received virus scanning information is not recent when comparing the scanning pattern acquisition dates.

Steps A1 and A2 of the information creating apparatus (user terminal) PC, processing up to steps P1 to P11 of the image forming apparatus (parent device) MFP-P, and processing up to steps C1 to C6 of the image forming apparatus (child device) MFP-C in FIG. 16 are the same processing as in FIG. 15, and thus description thereof will be omitted.

Similarly to FIG. 15, after the transmitted print information 47 is received (received print information 147) in step C6 of the child device MFP-C, it is confirmed in step C7 whether virus scanning information is included in each piece of print data in the received print information 147.

When virus scanning information is not included in print data in step C21, the child device executes virus scanning processing on the received print data similar to FIG. 15, when no virus has been detected in step C22, the child device prints the received print data on a predetermined print sheet, and when a virus has been detected in step C23, the child device does not print the received print data.

On the other hand, in step C31, when virus scanning information is included in print data, it is checked whether the pattern acquisition date of the received virus scanning information is recent or not.

Here, the scanning pattern acquisition date of the scanning processing information 144 stored in the storage 140 of the child device is read out and compared with the scanning pattern acquisition date of the received virus scanning information.

In step C32, when the scanning pattern acquisition date of the received virus scanning information is more recent than the scanning pattern acquisition date of the scanning processing information 144 stored in the storage 140 of the child device, the received print data is printed on a predetermined print sheet.

On the other hand, in step C33, when the scanning pattern acquisition date of the received virus scanning information is less recent than the scanning pattern acquisition date of the scanning processing information 144 stored in the storage 140 of the child device, virus scanning processing is executed on the print data including the received virus scanning information.

When no virus has been detected in step C34, the received print data is printed on a predetermined print sheet, and when a virus has been detected in step C35, the received print data is not printed.

Example 5 of Information Communication Processing: Encryption Performed with Private Key of Child Device, C01 in FIG. 12

FIG. 17 illustrates a communication sequence of an example of information communication processing in which, after infection countermeasure processing is performed on print data input to a parent device, the print data to which the virus scanning information encrypted with a public key of a child device is added is transmitted to the child device, and printing processing is executed in the child device for only print data having been subjected to virus scanning processing and having virus scanning information decrypted with a private key of the child device.

Here, similar to the example of FIG. 13, it is assumed that a job list including a print data name of only print data having been subjected to virus scanning processing (scanned job) in the parent device is transmitted to the child device, only a file of the print data having been subjected to virus scanning processing (scanned job) is transmitted to the child device, and the job list to be transmitted to the child device and the file of the print data necessarily include virus scanning information (scanned job).

However, this example is different from the example of FIG. 13 in that print data to which virus scanning information encrypted with the public key of the child device is added is transmitted to the child device in the parent device.

In the child device, the encrypted virus scanning information is decrypted with the private key of the child device, and when the decryption is performed normally, the received print data is printed, but when the decryption cannot be performed, the received print data is not printed. It is assumed that the child device does not have a virus scanning engine and cannot execute virus scanning processing, and only print data including virus scanning information (scanned job) is printed.

FIG. 17 also illustrates a communication sequence performed between the information creating apparatus (user terminal) PC, the image forming apparatus (parent device) MFP-P, and the image forming apparatus (child device) MFP-C.

In FIG. 17, the same step numbers are given to steps of performing the same processing as the steps in FIG. 13.

Steps A1 and A2 of the information creating apparatus (user terminal) PC, processing up to steps P1 to P9 of the image forming apparatus (parent device) MFP-P, and processing up to steps C1 to C5 of the image forming apparatus (child device) MFP-C in FIG. 17 are the same processing as in FIG. 13, and therefore description thereof will be omitted.

In step P9 of the image forming apparatus (parent device) MFP-P, after requested print data is acquired from the storage 40, virus scanning information stored in the parent device is encrypted with the public key of the child device in step P31.

In step P32, transmitted print information including the print data having the encrypted virus scanning information added thereto is generated.

Thereafter, in step P11, the generated transmitted print information 47 is transmitted to the child device MFP-C.

In step C6 of the child device MFP-C, the transmitted print information 47 is received (received print information 147).

In step C41, the encrypted virus scanning information included in the received transmitted print information 47 is acquired, and the encrypted virus scanning information is decrypted with the private key of the child device.

In step C42, it is checked whether the encrypted virus scanning information can be decrypted. That is, it is checked whether the normal virus scanning information has been restored by the decryption.

When the encrypted virus scanning information can be normally decrypted in step C43, the received print data is printed on a predetermined print sheet, and when the encrypted virus scanning information cannot be decrypted in step C44, the received print data is not printed.

Although the encryption of the virus scanning information is performed in step P31 in FIG. 17, the acquired virus scanning information may be encrypted with the public key of the child device after step P3 of acquiring the virus scanning information.

Alternatively, when the scanning engine and the virus pattern file are updated to new versions in the parent device, the contents of the virus scanning information may also be updated to those corresponding to the updated scanning engine and virus pattern file, and the updated virus scanning information may be encrypted with the public key of the child device.

In this case, since the encrypted virus scanning information is added to the print data in step P4, the encryption is not performed in step P31.

Example 6 of Information Communication Processing: Encryption Performed with Private Key of Parent Device, B02 in FIG. 11

FIG. 18 illustrates a communication sequence of an example of information communication processing in which, after infection countermeasure processing is performed on print data input to a parent device, the print data to which virus scanning information encrypted with a private key of the parent device is added is transmitted to a child device, it is determined whether printing processing can be executed in a child device in accordance with the presence or absence of virus scanning information to be added to the print data, and printing processing is executed in the child device for only print data having been subjected to virus scanning processing and having virus scanning information decrypted with a public key of the parent device.

FIG. 18 also illustrates a communication sequence performed between the information creating apparatus (user terminal) PC, the image forming apparatus (parent device) MFP-P, and the image forming apparatus (child device) MFP-C.

In FIG. 18, the same step numbers are given to steps of performing the same processing as the steps in FIG. 17 and the like.

In this example, similar to the example of FIG. 14, it is assumed that virus scanning processing is executed on the input print data in the parent device, a virus scanning engine and virus pattern information are stored in the parent device, and the virus scanning information as illustrated in FIG. 6 is stored.

Further, it is assumed that virus scanning information is added to print data on which virus scanning processing has been executed in the parent device and in which no virus has been detected, but virus scanning information is not added to print data on which virus scanning processing has not been executed.

A job list to be transmitted to the child device includes a print data name of print data on which virus scanning processing has been executed (scanned job) and a print data name of print data on which virus scanning processing has not been executed (unscanned job). Transmitted print information transmitted to the child device includes files of a scanned job and an unscanned job, the scanned job is print data which includes virus scanning information and in which no virus has been detected, and the unscanned job is print data which does not include virus scanning information and for which it is unclear whether the print data is infected.

The example of FIG. 18 is different from the example of FIG. 17 in that the parent device transmits print data to which virus scanning information encrypted with the private key of the parent device is added to the child device.

In the child device, the encrypted virus scanning information is decrypted with the public key of the parent device, and when the decryption is performed normally, the received print data is printed, but when the decryption cannot be performed, the received print data is not printed.

It is assumed that the child device does not have a virus scanning engine and cannot execute virus scanning processing, print data not including virus scanning information (unscanned job) is not printed, and print data including virus scanning information (scanned job) is decrypted with the public key of the parent device.

Steps A1 and A2 of the information creating apparatus (user terminal) PC, processing up to steps P1 to P9 of the image forming apparatus (parent device) MFP-P, and processing up to steps C1 to C5 of the image forming apparatus (child device) MFP-C in FIG. 18 are the same processing as in FIG. 17, and therefore description thereof will be omitted.

In step P9 of the image forming apparatus (parent device) MFP-P, after requested print data is acquired from the storage 40, virus scanning information stored in the parent device is encrypted with the private key of the parent device in step P41.

Similarly to step P32, in step P42, transmitted print information including the print data having the encrypted virus scanning information added thereto is generated.

Thereafter, in step P11, the generated transmitted print information 47 is transmitted to the child device MFP-C.

In step C6 of the child device MFP-C, the transmitted print information 47 is received (received print information 147).

In step C7, it is confirmed whether virus scanning information is included in each piece of print data in the received print information 147.

In step C12, when virus scanning information is not included in print data, the received print data is not printed.

On the other hand, in step C51, when virus scanning information is included in print data, the encrypted virus scanning information is decrypted with the public key of the parent device.

Similarly to step C42 described above, in step C52, it is checked whether the encrypted virus scanning information can be decrypted.

That is, it is checked whether the normal virus scanning information has been restored by the decryption.

In step C53, when decryption cannot be performed, the received print data is not printed.

In step C54, when the encrypted virus scanning information can be normally decrypted, the received print data is printed on a predetermined print sheet.

Although the encryption of the virus scanning information is not performed in step P41 in the example of FIG. 18, the acquired virus scanning information may be encrypted with the private key of the parent device after step P3 of acquiring the virus scanning information. Alternatively, when the scanning engine and the virus pattern file are updated to new versions in the parent device, the contents of the virus scanning information may also be updated, and the updated virus scanning information may be encrypted with the private key of the parent device.

Example 7 of Information Communication Processing: Encryption Performed with Private Key of Parent Device, B03 in FIG. 11

FIG. 19 illustrates a communication sequence of an example of information communication processing in which, after infection countermeasure processing is performed on print data input to a parent device, the print data to which virus scanning information encrypted with a private key of the parent device is added is transmitted to a child device, it is determined whether printing processing can be executed in a child device in accordance with the presence or absence of virus scanning information to be added to the print data, whether the virus scanning information can be decrypted using a public key of the parent device, and more recent and less recent pattern acquisition dates included in virus scanning information to be added to a print job, virus scanning information can be decrypted using the public key of the parent device when there is virus scanning information, and printing processing is executed in the child device for only print data having a recent pattern acquisition date.

FIG. 19 also illustrates a communication sequence performed between the information creating apparatus (user terminal) PC, the image forming apparatus (parent device) MFP-P, and the image forming apparatus (child device) MFP-C.

In FIG. 19, the same step numbers are given to steps of performing the same processing as the steps in FIG. 18 and the like.

The example of FIG. 19 is the same as the example of FIG. 18 in that the parent device transmits print data to which virus scanning information encrypted with the private key of the parent device is added to the child device, and the child device decrypts the encrypted virus scanning information with the public key of the parent device.

Similar to the example of FIG. 18, it is assumed that the child device does not have a virus scanning engine and cannot execute virus scanning processing, print data not including virus scanning information (unscanned job) is not printed, and print data including virus scanning information (scanned job) is decrypted with the public key of the parent device.

This example is the same as the example of FIG. 18 in that the received print data is not to be printed when the print data cannot be normally decrypted. However, unlike the example of FIG. 18, when the print data has been normally decrypted, it is assumed that the child device checks whether the pattern acquisition date of the received virus scanning information is recent or not.

That is, when virus scanning information is included in the received print information, the scanning pattern acquisition date of the received virus scanning information and the scanning pattern acquisition date of the scanning processing information 144 stored in the storage 140 of the child device are compared with each other to confirm which date is more recent.

Steps A1 and A2 of the information creating apparatus (user terminal) PC, processing up to steps P1 to P11 of the image forming apparatus (parent device) MFP-P, and processing up to steps C1 to C52 of the image forming apparatus (child device) MFP-C in FIG. 19 are the same processing as in FIG. 18, and thus description thereof will be omitted.

Similarly to FIG. 18, in step C52, it is checked whether the encrypted virus scanning information can be decrypted.

Similarly to FIG. 18, in step C53, when decryption cannot be performed, the received print data is not printed.

On the other hand, in step C61, when the encrypted virus scanning information can be normally decrypted, it is checked whether the pattern acquisition date of the received encrypted virus scanning information is recent or not.

Here, the scanning pattern acquisition date of the scanning processing information 144 stored in the storage 140 of the child device is read out and compared with the scanning pattern acquisition date of the received virus scanning information.

In step C62, when the scanning pattern acquisition date of the received virus scanning information is less recent than the scanning pattern acquisition date of the scanning processing information 144 stored in the storage 140 of the child device, the received print data is not printed.

On the other hand, in step C63, when the scanning pattern acquisition date of the received virus scanning information is more recent than the scanning pattern acquisition date of the scanning processing information 144 stored in the storage 140 of the child device, the received print data is printed on a predetermined print sheet.

Example 8 of Information Communication Processing: Encryption Performed with Private Key of Parent Device, B04 in FIG. 11

FIG. 20 illustrates a communication sequence of an example of information communication processing in which, after infection countermeasure processing is performed on print data input to a parent device, the print data to which virus scanning information encrypted with a private key of the parent device is added is transmitted to a child device, it is determined whether printing processing can be executed in a child device in accordance with the presence or absence of virus scanning information to be added to the print data, whether the virus scanning information can be decrypted using a public key of the parent device, and more recent and less recent pattern acquisition dates included in virus scanning information to be added to a print job, and virus scanning processing is executed in the child device for print data that does not have virus scanning information, print data that cannot be decrypted with the public key of the parent device, and print data not having a recent pattern acquisition date.

FIG. 20 also illustrates a communication sequence performed between the information creating apparatus (user terminal) PC, the image forming apparatus (parent device) MFP-P, and the image forming apparatus (child device) MFP-C.

In FIG. 20, the same step numbers are given to steps of performing the same processing as the steps in FIG. 19 and the like.

The example of FIG. 20 is the same as the examples of FIGS. 18 and 19 in that the parent device transmits print data to which virus scanning information encrypted with the private key of the parent device is added to the child device, and the child device decrypts the encrypted virus scanning information with the public key of the parent device. When the decryption has been performed normally, the child device checks whether the pattern acquisition date of the received virus scanning information is recent or not, similar to the example of FIG. 19.

On the other hand, unlike the example of FIG. 19 and assuming that the child device includes a virus scanning engine, virus scanning processing is executed in the child device when the received print data is print data which does not include virus scanning information (unscanned job), when print data includes virus scanning information (scanned job) and the virus scanning information cannot be normally decrypted, and when virus scanning information has been normally decrypted but the pattern acquisition date of the received virus scanning information is not recent.

Steps A1 and A2 of the information creating apparatus (user terminal) PC, processing up to steps P1 to P11 of the image forming apparatus (parent device) MFP-P, and processing up to steps C1 to C7 of the image forming apparatus (child device) MFP-C in FIG. 20 are the same processing as in FIG. 19, and thus description thereof will be omitted.

Similarly to FIG. 19, in step C7, it is checked whether there is encrypted virus scanning information.

In step C71, when print data does not include encrypted virus scanning information, the processing proceeds to step C21, and when print data includes encrypted virus scanning information, the processing proceeds to step C51.

In step C21, when print data does not include virus scanning information, virus scanning processing is executed on the received print data in the child device, similar to FIGS. 15 and 16. In step C22, when no virus has been detected, the received print data is printed on a predetermined print sheet. In step C23, when a virus has been detected, the received print data is not printed.

On the other hand, in step C51, when virus scanning information is included in print data, the encrypted virus scanning information is decrypted with the public key of the parent device.

Similarly to step C42 described above, in step C52, it is checked whether the encrypted virus scanning information can be decrypted.

That is, it is checked whether the normal virus scanning information has been restored by the decryption.

In step C72, when the decryption cannot be performed, the processing proceeds to step C21 to execute virus scanning processing.

On the other hand, in step C61, when the encrypted virus scanning information can be normally decrypted, it is checked whether the pattern acquisition date of the received encrypted virus scanning information is recent or not.

In step C73, when the scanning pattern acquisition date of the received virus scanning information is less recent than the scanning pattern acquisition date of the scanning processing information 144 stored in the storage 140 of the child device, the processing proceeds to step C21 to execute virus scanning processing.

On the other hand, in step C63, when the scanning pattern acquisition date of the received virus scanning information is more recent than the scanning pattern acquisition date of the scanning processing information 144 stored in the storage 140 of the child device, the received print data is printed on a predetermined print sheet.

OTHER EXAMPLES

First Embodiment: Encryption Target

In the above-described examples, description has been mainly given on the assumption that an object to be encrypted is virus scanning information.

However, in order to increase confidentiality of information transmitted and received between a parent device and a child device and to prevent leakage and tampering of the information, an object to be encrypted is not limited to virus scanning information, and all pieces of information transmitted and received between the parent device and the child device may be encrypted.

For example, both print data acquired in the parent device and virus scanning information may be set as an object to be encrypted, or only the acquired print data may be set as an object to be encrypted.

In the parent device, safety of print data transmitted to the child device can be further increased by performing virus scanning processing on the acquired print data and encrypting the print data in which no virus has been detected.

Second Embodiment: Transmitted Print Information

In the above-described examples, in order to reduce the possibility of infection in a child device, infection countermeasure processing such as virus scanning processing is executed on print data acquired in a parent device, and virus scanning information is added to print data in which no computer virus has been detected. Further, in FIG. 13, transmitted print information including only print data requested by a child device and having virus scanning information added thereto is generated and transmitted to the child device.

However, when appropriate infection countermeasure processing is performed in the child device, print data in which a computer virus has been detected as a result of the execution of the infection countermeasure processing (virus scanning processing) in the parent device may be transmitted to the child device.

For example, when the transmitted print information transmitted from the parent device is received by the child device, the child device is connected to an infection countermeasure management server which is considered to store the latest virus scanning engine and the latest virus pattern file, acquires the latest virus scanning engine and the latest virus pattern file at the time of the connection from the infection countermeasure management server, and executes the infection countermeasure processing (virus scanning processing) on print data in which a computer virus included in the transmitted print information has been detected, using the acquired latest virus scanning engine and latest virus pattern file.

Thereby, it is possible to further reduce the possibility of infection in the child device.

Third Embodiment: Date of Execution of Virus Scanning Processing in Parent Device In the above-described examples, description has been given on the assumption that virus scanning information includes the information as illustrated in FIG. 6.

However, the information included in the virus scanning information is not limited to these pieces of information, and other information may be included.

Although virus scanning processing is executed for each piece of print data acquired in the parent device, the print data temporarily stored in the parent device is not necessarily printed immediately in the child device, and may be printed in the child device after a considerable period of time has elapsed since the print data has been temporarily stored.

Consequently, the date and time when the virus scanning processing is actually executed (execution date) on the print data may be included in the virus scanning information, and the virus scanning information including the execution date may be added to the print data when the print data is temporarily stored in the parent device.

When the print data to which the virus scanning information including the execution date is added is transmitted to the child device, the child device compares the execution date included in the virus scanning information with the current date. When the execution date is considerably less recent than the current date, for example, when the execution date is one week or more before the current date, the child device may execute virus scanning processing using the latest virus pattern file at the current point in time, and the like.

Thereby, it is possible to further reduce the possibility of infection in the child device.

Fourth Embodiment: Transmission of Unscanned Job

In the above-described examples, a job list created in a parent device and transmitted to a child device may include print data on which virus scanning processing has not yet been executed (unscanned job), and a user who has confirmed the job list may select the unscanned job as data for requesting printing.

In this manner, when the unscanned job has been selected, the parent device may execute virus scanning processing on the unscanned job by using the latest virus pattern file or the like at that point in time immediately before the unscanned job is transmitted from the parent device to the child device.

When a virus has not been detected as a result of the execution of the virus scanning processing in the parent device, only print data in which no virus has been detected may be transmitted to the child device.

In addition, print data in which a virus has been detected need not be transmitted to the child device, or the child device may be notified of a warning indicating that requested print data has been infected with a virus, and the warning may be displayed on a display of the child device.

When the user has selected an unscanned job as data to be printed, a warning indicating that print data having not yet been subjected to virus scanning processing (unscanned job) is included in the selected print data may be displayed in the child device before a print data request is transmitted to the parent device.

Fifth Embodiment: Display Screen for Job List in Child Device

In the above-described examples, as illustrated in FIG. 8, a job list including the name of temporarily stored print data, whether printing has been selected, and whether virus scanning processing has been performed (unscanned/scanned) is displayed on the display 103 of the child device.

However, other information may be displayed on the print job list display screen G1 displayed on the child device.

Since the job list transmitted from the parent device to the child device includes virus scanning information including a scanning pattern acquisition date and the like, the display screen G1 may display not only "unscanned/scanned", but also, for example, a warning indicating that the job list includes print data not having a recent scanning pattern acquisition date used in the virus scanning processing or indicating that print data having not been subjected to virus scanning processing is likely to be infected.

When the child device does not have an infection countermeasure function, a message indicating that print data having not been subjected to virus scanning processing or print data not having a recent scanning pattern acquisition date is not printed may be displayed on the display screen G1.

Alternatively, when infection countermeasure processing (virus scanning processing) can be executed in the child device, a message indicating that requested print data may not be printed may be displayed on the display screen G1, depending on the result of the virus scanning processing executed in the child device.

Sixth Embodiment: Setting in Parent Device and Child Device

In the above-described examples, it is determined whether printing is executable in the child device based on whether there is virus scanning information, whether decryption is executable, a scanning pattern acquisition date, and the like.

This determination processing may be incorporated in programs of the parent device and the child device in advance. However, setting items of determination conditions may be defined, and these setting items may be set in advance before the operation is started and may be set to be changeable after the operation is started by a person in charge of management or a user of an image forming apparatus.

For example, setting items for encryption and decryption may be provided, and whether to perform encryption and decryption may be set and stored in advance in the parent device and the child device.

As an item to be set in the parent device, it may be possible to select any one of whether to transmit only print data in which no virus has been detected as a result of execution of virus scanning processing on print data to be transmitted to the child device, whether to transmit all pieces of print data having been subjected to virus scanning processing, or whether to transmit all pieces of print data requested from the child device inclusive of print data having not been subjected to virus scanning processing.

Whether to confirm a scanning pattern acquisition date of received virus scanning information may be set and stored in advance in the child device. In addition, when it is determined whether the scanning pattern acquisition date of the received virus scanning information is recent or not, an arbitrary difference in number of days determined to be recent may be set and stored in advance in the child device.

Further, when infection countermeasure processing (virus scanning processing) can be executed in the child device, whether the virus scanning processing is to be executed may be set and stored in advance.

Alternatively, when a difference between the virus pattern acquisition date of the parent device and the virus pattern acquisition date of the child device is smaller than the set and stored number of days, whether the virus scanning processing is executed by the child device may be set and stored in advance.

REFERENCE SIGNS LIST

1 Image forming apparatus (parent device)
2 Image forming apparatus (child device)
3 Information creating apparatus (user terminal)
4 Network
5 Network
6 Information management apparatus (management server)
11 Controller
12 Operation inputter
13 Display
14 Image processor
15 Communicator
21 Print data acquirer
22 Virus detector
23 Virus remover
24 Virus scanning information generator
25 Job list processor
26 Job list request receiver
27 job list generator
28 Job list transmitter
29 Encryption processor
30 Print information processor
31 Print data request receiver
32 Print information generator
33 Print information transmitter
40 Storage
41 Parent device information
42 Child device information
43 Encryption key information
44 Input print data
45 Virus scanning information
46 Job list
47 Transmitted print information
48 Job list request 49 Print data request
101 Controller
102 Operation inputter
103 Display
104 Image processor
105 Communicator
106 Function executor
107 Virus detector
108 Virus remover
111 Job list requester
112 Job list receiver
113 Print data requester
114 Print information receiver
115 Scanning information acquirer
116 Scanning information confirmation processor
117 Decryption processor
118 Printing execution determiner
140 Storage
141 Parent device information
142 Child device information
143 Encryption key information
144 Scanning processing information
145 Job list request
146 Received job list
147 Received print information
148 Print data request

The invention claimed is:

1. An information processing apparatus comprising:
a print data acquirer that acquires print data;
a virus detector that executes predetermined infection countermeasure processing on the print data and detects a computer virus;
a virus scanning information generator that generates virus scanning information for specifying a setting item related to the infection countermeasure processing executed and adds the virus scanning information to print data in which a computer virus has not been detected by the virus detector;
a print information generator that generates print information including print data requested from an image forming apparatus connected via a network among a plurality of pieces of the print data acquired; and
a print information transmitter that transmits the generated print information to the image forming apparatus.

2. The information processing apparatus according to claim 1,
wherein the print information generator generates print information including print data which is requested by the image forming apparatus and to which the virus scanning information is added.

3. The information processing apparatus according to claim 1,
wherein the infection countermeasure processing includes virus scanning processing for detecting a known computer virus by using a predetermined virus scanning engine and a predetermined virus pattern file, and
the virus scanning information includes a name and version information of the virus scanning engine, version information of the virus pattern file, and information of date when the virus pattern file is acquired.

4. The information processing apparatus according to claim 1,
wherein the information processing apparatus is an image forming apparatus that temporarily stores the acquired print data and performs image forming.

5. An image processing system in which a first image forming apparatus that temporarily stores print data and a second image forming apparatus that prints the print data are connected to each other via a network,
the first image forming apparatus comprising:
a print data acquirer that acquires print data;
a storage that temporarily stores the acquired print data;
a virus detector that executes predetermined infection countermeasure processing on the print data and detects a computer virus;
a virus scanning information generator that generates virus scanning information for specifying a setting item related to the executed infection countermeasure processing and adds the virus scanning information to print data in which a computer virus has not been detected by the virus detector;
a print information generator that generates print information including print data requested by the second image forming apparatus among a plurality of pieces of the print data temporarily stored; and
a print information transmitter that transmits the generated print information to the second image forming apparatus, and
the second image forming apparatus comprising:
a print data requester that requests the first image forming apparatus to transmit predetermined print data among the plurality of pieces of the print data temporarily stored in the first image forming apparatus;
a print information receiver that receives print information transmitted from the first image forming apparatus;
a scanning information acquirer that acquires virus scanning information added to print data included in the received print information;
a printing execution determiner that determines whether to print the print data included in the received print information by using the acquired virus scanning information; and
a function executor that prints the print data when the printing execution determiner determines that the print data is to be printed.

6. The image processing system according to claim 5,
wherein the print information generated by the print information generator includes the print data to which the virus scanning information is added.

7. The image processing system according to claim 5,
wherein the infection countermeasure processing includes virus scanning processing of detecting a known computer virus by using a first virus scanning engine and a first virus pattern file, and
the virus scanning information includes a name and version information of the first virus scanning engine, version information of the first virus pattern file, and information of date when the first virus pattern file is acquired.

8. The image processing system according to claim 5,
wherein, when the print information received by the print information receiver includes the print data to which the virus scanning information is added and the print data to which no virus scanning information is added,
the printing execution determiner determines that the print data to which the virus scanning information is added is to be printed, and determines that the print data to which no virus scanning information is added is not to be printed.

9. The image processing system according to claim 5, further comprising:
a job list processor that when the first image forming apparatus has received a job list request transmitted from the second image forming apparatus, generates a job list and transmits the generated job list to the second image forming apparatus having transmitted the job list request, the job list including a name of print data requested in the job list request among a plurality of pieces of the print data temporarily stored in the storage of the first image forming apparatus, and the job list also including the virus scanning information when the requested print data is print data to which the virus scanning information is added.

10. The image processing system according to claim 9, wherein the second image forming apparatus further includes
a job list receiver that receives the job list transmitted from the first image forming apparatus, and
a display, and
when the job list receiver has received the job list, the received job list is displayed on the display.

11. The image processing system according to claim 7, wherein the second image forming apparatus further includes
a second virus detector that detects a computer virus by executing infection countermeasure processing including virus scanning processing on the received print data, the virus scanning processing being for detecting a known computer virus by using a second virus scanning engine and a second virus pattern file, and
a second storage that stores scanning processing information including a name and version information of the second virus scanning engine, version information of the second virus pattern file, and date information on acquisition of the second virus pattern file, and
the printing execution determiner
compares the virus scanning information added to the received print data with the scanning processing information stored in the second storage,
determines that the print data is to be printed when the virus scanning information is newer than the scanning processing information, and
determines that the print data is not to be printed when the virus scanning information is older than the scanning processing information.

12. The image processing system according to claim 11, wherein the printing execution determiner
compares information of date when the first virus pattern file included in the virus scanning information added to the received print data is acquired with information of date when the second virus pattern file included in the scanning processing information stored in the second storage is acquired,
determines that the print data is to be printed when the information of date when the first virus pattern file is acquired is newer than the information of date when the second virus pattern file is acquired, and
determines that the print data is not to be printed when the information of date when the first virus pattern file is acquired is older than the information of date when the second virus pattern file is acquired.

13. The image processing system according to claim 11, wherein the second virus detector executes the infection countermeasure processing on the print data determined not to be printed by the printing execution determiner, and
the print data in which a computer virus is detected is not to be printed, and the print data in which a computer virus is not detected is to be printed.

14. The image processing system according to claim 5, wherein the first image forming apparatus further includes an encryption processor that encrypts the generated virus scanning information with a first encryption key,
the virus scanning information generator adds the encrypted virus scanning information to the print data,
the second image forming apparatus further includes a decryption processor that decrypts the encrypted virus scanning information with a second encryption key, and
the decryption processor decrypts the encrypted virus scanning information added to the print data included in the print information received by the print information receiver, and then the scanning information acquirer acquires the decrypted virus scanning information as virus scanning information.

15. The image processing system according to claim 14, wherein, when the print data to which the encrypted virus scanning information is added is included in the print information received by the print information receiver, and the encrypted virus scanning information is decrypted by the decryption processor,
the printing execution determiner
determines that the print data to which the encrypted virus scanning information is added is to be printed when the decryption has been performed normally, and
determines that the print data to which the encrypted virus scanning information is added is not to be printed when the decryption has not been performed normally.

16. The image processing system according to claim 14, wherein the first encryption key is a private key for the first image forming apparatus, and the second encryption key is a public key for the first image forming apparatus.

17. The image processing system according to claim 14, wherein the first encryption key is a public key for the second image forming apparatus, and the second encryption key is a private key for the second image forming apparatus.

18. The image processing system according to claim 8, wherein the second image forming apparatus further includes a second virus detector that detects a computer virus by executing infection countermeasure processing including virus scanning processing on the received print data, the virus scanning processing being for detecting a known computer virus by using a second virus scanning engine and a second virus pattern file,
the second virus detector executes the infection countermeasure processing on the print data determined not to be printed by the printing execution determiner, and
the print data in which a computer virus has been detected is not to be printed, and the print data in which a computer virus has not been detected is to be printed.

19. An infection countermeasure method for an image processing system in which a first image forming apparatus that temporarily stores print data and a second image forming apparatus that prints the print data are connected to each other via a network, the infection countermeasure method comprising:
by a first controller included in the first image forming apparatus,
acquiring print data,
temporarily storing the acquired print data,
executing predetermined infection countermeasure processing on the print data and detecting a computer virus,
generating virus scanning information for specifying a setting item related to the executed infection countermeasure processing, and adding the virus scanning information to the print data in which a computer virus has not been detected in the detecting of the computer virus, generating print information including print data requested by the second image forming apparatus among a plurality of pieces of the print data temporarily stored, and transmitting the generated print information to the second image forming apparatus; and by a second controller included in the second image forming apparatus, requesting the first image forming apparatus to transmit predetermined print data among the plurality of pieces of the print data temporarily stored in the first image forming apparatus, receiving print information transmitted from the first image forming apparatus, acquiring virus scanning information added to print data included in the received print information, determining whether to print the print data included in the received print information by using the acquired virus scanning information, and printing the print data when it is determined that the print data is to be printed in the determining of whether to print the print data.

* * * * *